(12) United States Patent
Teraoaka et al.

(10) Patent No.: US 7,284,044 B2
(45) Date of Patent: Oct. 16, 2007

(54) NETWORK TECHNIQUE FOR TROUBLESHOOTING

(75) Inventors: Yuji Teraoaka, Tokyo (JP); Yoshihiko Akasaka, Nagano-ken (JP); Kei Sato, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 777 days.

(21) Appl. No.: 10/307,524

(22) Filed: Dec. 2, 2002

(65) Prior Publication Data

US 2003/0115302 A1    Jun. 19, 2003

Related U.S. Application Data

(63) Continuation of application No. PCT/JP02/03139, filed on Mar. 29, 2002, now abandoned.

(30) Foreign Application Priority Data

| Mar. 30, 2001 | (JP) | .............. 2001-099668 |
| Nov. 21, 2001 | (JP) | .............. 2001-355888 |
| Dec. 21, 2001 | (JP) | .............. 2001-389261 |

(51) Int. Cl.
- G06F 15/177  (2006.01)
- G06F 15/16   (2006.01)
- G06F 9/445   (2006.01)
- G06F 17/20   (2006.01)

(52) U.S. Cl. .................. 709/221; 709/218; 704/8; 717/178

(58) Field of Classification Search ............ 709/217, 709/218, 221; 704/8; 717/173, 178
See application file for complete search history.

(56) References Cited

U.S. PATENT DOCUMENTS

| 5,870,610 A | 2/1999 | Beyda |
| 6,282,712 B1* | 8/2001 | Davis et al. ............... 717/170 |
| 6,668,376 B1* | 12/2003 | Wang et al. ............... 717/178 |
| 6,671,749 B2* | 12/2003 | Williams et al. ............ 710/10 |
| 6,694,354 B1* | 2/2004 | Elg ........................... 709/217 |
| 7,065,769 B1* | 6/2006 | Tolopka ..................... 719/321 |
| 7,076,536 B2* | 7/2006 | Chiloyan et al. .......... 709/220 |
| 7,130,895 B2* | 10/2006 | Zintel et al. ............... 709/220 |
| 2002/0067504 A1* | 6/2002 | Salgado et al. .......... 358/1.15 |
| 2002/0174206 A1* | 11/2002 | Moyer et al. .............. 709/221 |

(Continued)

FOREIGN PATENT DOCUMENTS

CN    1285935 A    2/2001

(Continued)

OTHER PUBLICATIONS

Computers Year 2000 Problem Solutions for PC Users (PC Work! 1999.10), Article.

(Continued)

*Primary Examiner*—Andrew Caldwell
*Assistant Examiner*—Douglas Blair
(74) *Attorney, Agent, or Firm*—Sughrue Mion, PLLC

(57) ABSTRACT

In response to a user's selection of a troubleshooting instruction element on a troubleshooting page displayed on a client 200 by a browser, the client 200 transmits a transfer request of a troubleshooting program to servers 110 and 120. The servers 110 and 120 transfer the troubleshooting program according to the transfer request. The troubleshooting program is automatically activated on the client 200 on completion of its download to the client 200, in order to execute a troubleshooting procedure.

4 Claims, 41 Drawing Sheets

U.S. PATENT DOCUMENTS

| | | | |
|---|---|---|---|
| 2003/0066066 A1* | 4/2003 | Nguyen et al. | 717/178 |
| 2003/0088866 A1* | 5/2003 | Boldon et al. | 717/170 |

FOREIGN PATENT DOCUMENTS

| | | |
|---|---|---|
| JP | 07-129373 | 5/1995 |
| JP | 09-244985 | 9/1997 |
| JP | 9-292980 | 11/1997 |
| JP | 10-164182 | 6/1998 |
| JP | 10-177473 | 6/1998 |
| JP | 10-22374 | 8/1998 |
| JP | 10-222676 | 8/1998 |
| JP | 10-269107 | 10/1998 |
| JP | 10-283129 | 10/1998 |
| JP | 10-322498 A | 12/1998 |
| JP | 11-88965 | 3/1999 |
| JP | 11-134135 | 5/1999 |
| JP | 11-252298 | 9/1999 |
| JP | 11-268385 | 10/1999 |
| JP | 11-282687 | 10/1999 |
| JP | 2000-137627 | 5/2000 |
| JP | 2001-7969 A | 1/2001 |
| JP | 2001-027940 | 1/2001 |
| JP | 2001-043039 | 2/2001 |
| JP | 2002-023979 | 1/2002 |
| WO | WO98/50861 | 11/1998 |
| WO | 00/26805 A1 | 5/2000 |

OTHER PUBLICATIONS

F. Ikeda, "All About Windows2000 Professional", AI publishing Inc., Apr. 30, 2000, pp. 50-54, Partial.

"DocuColor 1255/DocuPrint 1255 Print Server Operation Manual", The Document Company Fuji Xerox, Dec. 2000, pp. 248-255, Adobe PostScript 3, partial.

Nishisei, Makoto, "Hints for keeping calm at the time of sudden system problem, Manual for troubleshooting of WindowsNT/2000," IDG Japan Corporation, Mar. 1, 2000, pp. 104-105, vol. 5, No. 3.

* cited by examiner

FIG.34

```
[File Data]

[Lang Data]
1= Welcome to Printer Driver Auto Installer !
2= Printer Driver Auto Installer will install the optimum driver
   for the printer by simple operations. Read the license
   agreement.
3= Agree
4= Disagree
```

NETWORK TECHNIQUE FOR TROUBLESHOOTING

CROSS-REFERENCE TO RELATED APPLICATION

This is a continuation of Application PCT/JP02/03139, filed Mar. 29, 2002, now abandoned.

BACKGROUND OF THE INVENTION

1. Field of the Invention

The present invention relates to a technique of troubleshooting a peripheral device linked with a client computer in a network environment including a server computer and the client computer connected with each other via the Internet.

2. Description of the Prior Art

A diversity of peripheral devices, such as a printer and a scanner, are connected to a personal computer via respective external interfaces. In the case of any abnormality or trouble arising in such a peripheral device, the user should conventionally refer to an instructions manual of the peripheral device. With advancement of recent technology, many user support pages for supporting users are open to the public on the Internet by manufacturers and dealers of the peripheral devices. Details of troubleshooting each peripheral device are on such a user support page provided by each of the manufacturers and dealers. It is, however, rather troublesome for the user to refer to the instructions manual or refer to the user support page for troubleshooting the peripheral device. General users often have difficulties in understanding the details of troubleshooting. Namely troubleshooting is rather complicated and difficult for the general user of the peripheral device.

One known system troubleshoots each peripheral device of the computer via the Internet by FAQ (Frequently Asked Questions) technique. The system provides the computer in an interactive manner with a question answer window of hierarchical structure, which includes questions on common problems and troubles of each peripheral device and answers to the questions. This shows the user possible causes of a problem arising in a target device and possible measures to the problem, so as to enable solution of the problem on the user's side. This systems, however, urges the user to choose one answer among options prepared in advance for each question, regardless of the working environment of the peripheral device by the user. The user can thus not choose a precise answer in some working environment of the peripheral device. In such cases, this system proposes neither an appropriate cause nor an effective measure to the user's problem.

As mentioned above, the diversity of peripheral devices, such as a printer and a scanner, are connected to the personal computer via the respective external interfaces. Installation of a driver program applicable for each peripheral device in the personal computer is required for the accurate operations of the peripheral device. Frequent version upgrading of the driver program corresponding to each peripheral device is commonly performed to ensure the more accurate operations of the peripheral device. In order to attain the more accurate operations of the peripheral device, it is accordingly necessary to install the driver program of the latest version in the personal computer. The user is thus required to select a latest driver program according to the type of the peripheral device and the linguistic environment of the personal computer and install the selected driver program. There are lots of difficulties in such installation for the users who do not have sufficient knowledge of the personal computer and the peripheral device.

SUMMARY OF THE INVENTION

The object of the present invention is thus to solve the drawbacks of the prior art technique and to provide a technique of readily troubleshooting a peripheral device. The object of the present invention is also to enable the user to select a more precise answer to a question in FAQ. The object of the present invention is further to enable a greater number of troubleshooting procedures for troubleshooting a peripheral device to be carried out on the user's side. The object of the present invention is also to enable any user even without sufficient knowledge of a computer or a peripheral device to readily install a driver program applicable for the peripheral device. The object of the present invention is additionally to enable a driver program applicable for a peripheral device linked with a computer to be installed via a network.

In order to achieve at least a part of the aforementioned objects, the present invention is structured as follows.

An upgrading support system of the present invention is an upgrading support system that supports upgrading of a device, which has computer functions and is connected to a network, the upgrading support system including:

a program storage module that stores therein an upgrading support program used to support upgrading of the device;

an upgrading instruction acceptance module that accepts an upgrading instruction of the device transmitted from the device via the network; and a program transfer module that, in response to acceptance of the upgrading instruction, transfers the upgrading support program stored in the program storage module to the device.

The upgrading support system of the present invention transfers the upgrading support program, which is used to support upgrading of the device, to the device in response to the accepted device upgrading instruction transmitted from the device via the network. This arrangement enables even the user of the device who does not have sufficient knowledge of the device to upgrade the device.

In the upgrading support system of the present invention, the device may include a computer and a peripheral device connected to the computer, or the device may include a home appliance that is connectable with network.

In the upgrading support system of the present invention, the upgrading support program may include a check program that is activated to check any trouble of the device, when being transferred to the device or the upgrading support program may include a functional program that functions in place of at least part of a specific program for actuating the device, when being transferred to the device.

A first server computer of the present invention is a server computer that is connected with a client computer via the Internet and is used to troubleshoot a peripheral device linked with the client computer, the server computer including:

a storage device that stores therein a troubleshooting page as a Web page displayed by a browser of the client computer, which includes a troubleshooting instruction element for instructing execution of a troubleshooting procedure to troubleshoot the peripheral device, and a troubleshooting program, which is executed on the client computer for the troubleshooting procedure; and a troubleshooting support module that, when a user of the client computer selects the troubleshooting instruction element on the troubleshooting page, receives a transfer request of the troubleshooting program transmitted from the client computer in response to the user's selection and transfers the troubleshooting program to the client computer according to the input transfer request.

In the first server computer of the present invention, when the user of the client computer selects the troubleshooting instruction element on the troubleshooting page, the troubleshooting program applicable for the peripheral device is transferred from the server computer to the client computer and is executed. This arrangement enables even the user who does not have sufficient knowledge of the client computer or the peripheral device to readily troubleshoot the peripheral device.

Further, in the first server computer of the present invention, the troubleshooting support module, when peripheral device information including a type of the peripheral device is supplied from the client computer, may refer to the peripheral device information and inform the client computer of a storage location of a troubleshooting program adoptable for the type of the peripheral device. This arrangement ensures effective notification of the storage location of the troubleshooting program applicable for the peripheral device.

Moreover, in the first server computer of the present invention, the troubleshooting support module, when peripheral device information including a type of the peripheral device is supplied from the client computer, may refer to the peripheral device information and transfer a troubleshooting program adoptable for the type of the peripheral device to the client computer. This arrangement ensures effective transfer of the troubleshooting program applicable for the peripheral device.

Furthermore, in the first server computer of the present invention, the troubleshooting support module may store type-program mapping information, which represents a mapping of multiple troubleshooting programs to multiple types of the peripheral device, and refer to the type-program mapping information based on the peripheral device information supplied from the client computer, so as to select the troubleshooting program mapped to the type of the peripheral device. This arrangement ensures effective selection of the troubleshooting program applicable for the peripheral device.

A second server computer of the present invention is a server computer that is connected with a client computer via the Internet and is used to install a driver program applicable for a peripheral device linked with the client computer, the server computer including:

a storage device that stores therein a driver auto installation page as a Web page displayed by a browser of the client computer, which includes an instruction element for instructing execution of auto installation of the driver program applicable for the peripheral device, and a driver setup program, which is executed on the client computer for auto installation of the driver program; and a troubleshooting support module that, when a user of the client computer selects the instruction element on the driver auto installation page, receives a transfer request of the driver setup program transmitted from the client computer in response to the user's selection and transfers the driver setup program to the client computer according to the input transfer request.

In the second server computer of the present invention, when the user of the client computer selects the instruction element on the driver auto installation page, the driver setup program is transferred from the server computer to the client computer and functions to automatically install the driver program. This arrangement enables even the user who does not have sufficient knowledge of the client computer or the peripheral device to readily install the driver program applicable for the peripheral device.

In the server computer of the present invention, the troubleshooting support module, when peripheral device information including a type of the peripheral device is supplied from the client computer, may refer to the peripheral device information and inform the client computer of a storage location of the driver setup program including a driver program adoptable for the type of the peripheral device. This arrangement ensures effective setup of the driver program applicable for the peripheral device.

Further, in the server computer of the present invention, the troubleshooting support module may store type-program mapping information, which represents a mapping of multiple driver programs to multiple types of the peripheral device, and refer to the type-program mapping information based on the peripheral device information supplied from the client computer, so as to select the driver program mapped to the type of the peripheral device. This arrangement ensures quick and effective installation of the driver program applicable for the peripheral device in the client computer.

A first method of troubleshooting of the present invention is a method of troubleshooting a peripheral device of a client computer connected via the Internet, the troubleshooting method including the steps of:

(a) storing a troubleshooting page as a Web page displayed by a browser of the client computer, which includes a troubleshooting instruction element for instructing execution of a troubleshooting procedure to troubleshoot the peripheral device;

(b) storing a troubleshooting program, which is executed on the client computer for the troubleshooting procedure; and (c) receiving a transfer request of the troubleshooting program transmitted from the client computer in response to a user's selection and transferring the troubleshooting program to the client computer according to the input transfer request, when the user of the client computer selects the troubleshooting instruction element on the troubleshooting page.

In the first method of troubleshooting of the present invention, when the user of the client computer selects the troubleshooting instruction element on the troubleshooting page, the troubleshooting program applicable for the peripheral device is transferred to the client computer and is executed. This arrangement enables even the user who does not have sufficient knowledge of the client computer or the peripheral device to readily troubleshoot the peripheral device.

A second method of troubleshooting of the present invention is a method of troubleshooting a peripheral device of a client computer connected via the Internet, the troubleshooting method including the steps of:

(a) storing a driver auto installation page as a Web page displayed by a browser of the client computer, which includes an instruction element for instructing execution of auto installation of the driver program applicable for the peripheral device;

(b) storing a driver setup program, which is executed on the client computer for auto installation of the driver program; and (c) receiving a transfer request of the driver setup program transmitted from the client computer in response to a user's selection and transferring the driver setup program to the client computer according to the input transfer request, when the user of the client computer selects the instruction element on the driver auto installation page.

In the second method of troubleshooting of the present invention, when the user of the client computer selects the instruction element on the driver auto installation page, the driver setup program is transferred to the client computer and functions to automatically install the driver program. This arrangement enables even the user who does not have sufficient knowledge of the client computer or the peripheral device to readily install the driver program applicable for the peripheral device.

A first client program of the present invention is a client program that is transferred from a server computer to a client computer via the Internet and is executed on the client computer to troubleshoot a peripheral device linked with the client computer, the client program including:

a first program that is automatically activated and executed on completion of its transfer from the server computer to the client computer and causes the client computer to carry out a predetermined troubleshooting procedure to troubleshoot the peripheral device.

According to the first client program of the present invention, on completion of its transfer from the server computer to the client computer, the client computer carries out a predetermined troubleshooting procedure to troubleshoot the peripheral device. This arrangement enables an effective measure to a problem arising in the peripheral device to be taken by the client computer, even if the user does not have sufficient knowledge of the client computer or the peripheral device.

In the client program of the present invention, the first program causes the client computer to carry out a preset procedure, which supplies a control signal for controlling the peripheral device to the peripheral device via an external interface and thereby makes the peripheral device execute a specified operation.

A second client program of the present invention is a client program that is transferred from a server computer to a client computer via the Internet and is executed on the client computer to install a driver program applicable for a peripheral device linked with the client computer, the client program including:

a first program that is automatically activated and executed on completion of its transfer from the server computer to the client computer and causes the client computer to carry out an installation of the driver program applicable for the peripheral device According to the second client program of the present invention, on completion of its transfer from the server computer to the client computer, the client computer carries out an installation of the driver program applicable for the peripheral device. This arrangement enables even the user who does not have sufficient knowledge of the client computer or the peripheral device to readily install the driver program applicable for the peripheral device.

In the client program of the present invention, there may be provided with a second program that causes the client computer to fetch peripheral device information including a type of the peripheral device from the peripheral device and to transfer the fetched peripheral device information to the server computer, prior to the transfer of the first program from the server computer to the client computer.

A troubleshooting device of the present invention is a troubleshooting device that troubleshoots a peripheral device of a client computer connected via a network, the troubleshooting device including:

a question answer providing module that provides the client computer with an interactive question answer window, which includes a question on a problem of the peripheral device and at least one answer to the question;

a program storage module that stores therein a check program, which is automatically activated on completion of its download and causes the peripheral device to carry out a predetermined check operation; and a download module that, in response to selection, on the client computer, of a specified answer included in the interactive question answer window provided by the question answer providing module, downloads the check program stored in the program storage module to the client computer, wherein the question answer providing module provides, on completion of the predetermined check operation carried out by the check program downloaded to the client computer by the download module, the client computer with a question answer window as one of the interactive question answer window, which includes a question relating to a result of the predetermined check operation and at least one answer to the question.

The troubleshooting device of the present invention provides the client computer connected via the network with an interactive question answer window, which includes a question on a problem of a peripheral device of the client computer and at least one answer. In response to selection, on the client computer, of a specified answer included in the interactive question answer window, a check program, which is automatically activated on completion of its download and causes the peripheral device to carry out a predetermined check operation, is downloaded to the client computer. On completion of the predetermined check operation carried out by the check program, the troubleshooting device provides the client computer with a question answer window as one of the interactive question answer window, which includes a question relating to a result of the predetermined check operation and at least one answer to the question. In this arrangement, the check program carries out the predetermined check operation. The user can thus select a precise answer based on the result of the predetermined check operation, regardless of the working environment of the peripheral device by the user. This results in finding an appropriate cause of and an effective measure to the trouble or problem arising in the peripheral device. The arrangement enables a greater number of troubleshooting procedures for troubleshooting the peripheral device to be carried out on the user's side. Here the network may be any of diverse networks, such as the Internet or an Intranet.

A troubleshooting method of the present invention is a troubleshooting method that provides a client computer connected via a network with an interactive question answer window, which includes a question on a problem of a peripheral device of the client computer and at least one answer to the question, to troubleshoot the peripheral device, the method including the steps of:

in response to selection, on the client computer, of a specified answer included in the provided interactive question answer window, downloading a check program, which is automatically activated on completion of its, download and causes the peripheral device to carry out a predetermined check operation; and on completion of the predetermined check operation carried out by the check program downloaded to the client computer, providing the client computer with a question answer window as one of the interactive question answer window, which includes a question relating to a result of the predetermined check operation and at least one answer to the question.

The troubleshooting method of the present invention causes the check program to carry out the predetermined check operation. The user can thus select a precise answer based on the result of the predetermined check operation, regardless of the working environment of the peripheral device by the user. This results in finding an appropriate cause of and an effective measure to the trouble or problem arising in the peripheral device. The arrangement enables a greater number of troubleshooting procedures for troubleshooting the peripheral device to be carried out on the user's side. Here the network may be any of diverse networks, such as the Internet or an Intranet.

The troubleshooting method of the present invention may further include the step of: providing multiple check programs that cause the peripheral device to carry out a plurality of different check operations, wherein the downloading step downloads, in response to selection, on the client computer, of the specified answer included in the provided interactive question answer window, a check program corresponding to the specified answer selected out of the multiple check programs. Multiple check programs are downloaded to carry out respective check operations at appropriate timings. This arrangement thus ensures the more effective troubleshooting.

Further, in the troubleshooting method of the present invention, the check program may examine an operating system used in the client computer and a driver of the peripheral device as the predetermined check operation. This arrangement effectively deals with the trouble or the problem due to the operating system or the driver.

Moreover, in the troubleshooting method of the present invention, the peripheral device may include a printer, and the check program causes the printer to print a preset printing image. This arrangement enables the user to select a more precise answer with regard to the current printing status of the printer, based on the preset printing image. In the troubleshooting method of the present invention structured in this way, the check program may include a program that causes the printer to clean a head of the printer. This arrangement enables the user to select a right answer with regard to the effect of cleaning carried out for troubleshooting.

Furthermore, in the troubleshooting method of the present invention, the peripheral device may include a scanner, and the check program may cause the scanner to read a preset input image. This arrangement enables the user to select a more precise answer with regard to the current reading status of the scanner, based on the preset input image.

A driver auto installation device of the present invention is a driver auto installation device that causes a driver program applicable for a peripheral device linked with a client computer to be automatically installed to the client computer via a network, the driver auto installation device including:

an auto installation selection window output module that outputs an auto installation selection input window to the client computer via the network, which enables the client computer to selectively input an instruction for auto installation of the driver program;

a driver storage module that stores the driver program applicable for the peripheral device; and a driver output module that outputs the driver program stored in the driver storage module to the client computer to allow installation of the driver program in the client computer, in response to the selective input of the instruction for auto installation on the auto installation selection input window by the client computer.

The driver auto installation device of the present invention uses the auto installation selection input window output to and displayed on the client computer via the network to accept the selective input of the instruction for auto installation of the driver program applicable for the peripheral device linked with the client computer. In response to the selective input of the instruction for auto installation, the stored driver program applicable for the peripheral device is output to the client computer to allow installation in the client computer. This arrangement enables the driver program applicable for the peripheral device linked with the client computer to be readily installed via the network.

A driver installation program of the present invention is a driver installation program that is automatically activated on completion of its download to a client computer and causes a driver program applicable for a peripheral device linked with the client computer to be downloaded from a driver supply device connected via a network and to be installed in the client computer.

By simply downloading the driver installation program of the present invention to the client computer, the driver program applicable for the peripheral device linked with the client computer can be installed in the client computer. Namely this arrangement attains easy installation of the driver program.

The driver installation program of the present invention may be activated on the client computer to examine a linguistic environment of the client computer, to download a linguistic file corresponding to a result of the examination from the driver supply device that stores character strings in multiple languages in the form of linguistic files, each of which is to be displayed on a window of the client computer in a process of inputting and/or installing the driver program, and to display a character string on the client computer based on the downloaded linguistic file in the process of inputting and/or installing the driver program. This arrangement allows the driver program to be downloaded and installed, while the character string suitable for the linguistic environment of the client computer is displayed.

Further, in the driver installation program of the present invention, there may be provided with a program that fetches information on the peripheral device linked with the client computer, retrieves a storage location of a driver program corresponding to the fetched information in the driver supply device, and downloads the corresponding driver program from the retrieved storage location. This arrangement enables the driver program applicable for the peripheral device linked with the client computer to be more accurately installed in the client computer.

Moreover, in the driver installation program of the present invention, the network may be the Internet, and the driver supply device may be a Web server.

A driver auto installation method of the present invention is a driver auto installation method that causes a driver program applicable for a peripheral device linked with a client computer to be automatically installed to the client computer via a network, the driver auto installation method including the steps of:

(a) accepting a selective input of an instruction for auto installation of the driver program from the client computer;

(b) downloading the driver program to the client computer via the network, in response to the accepted selective input; and (c) installing the downloaded driver program.

The driver auto installation method of the present invention enables the driver program applicable for the peripheral device linked with the client computer to be more accurately installed in the client computer via a network.

In the driver auto installation method of the present invention, the step (b) includes the sub-steps of:

examining a linguistic environment of the client computer;

downloading a linguistic file corresponding to a result of the examination, where the linguistic file includes a character string to be displayed on a window of the client computer in a process of downloading and/or installing the driver program; and displaying the character string on the client computer based on the downloaded linguistic file in the process of downloading and/or installing the driver program. This arrangement allows the driver program to be downloaded and installed, while the character string suitable for the linguistic environment of the client computer is displayed.

In the driver auto installation method of the present invention, the step (b) includes the sub-steps of:

fetching information on the peripheral device linked with the client computer;

retrieving a storage location of a driver program applicable for the peripheral device, based on the fetched information; and downloading the applicable driver program from the retrieved storage location. This arrangement enables the driver program applicable for the peripheral device linked with the client computer to be more accurately installed in the client computer, even if the user does not have sufficient knowledge of the computer or the peripheral device.

The technique of the present invention is actualized by a diversity of applications. The applications include a method of troubleshooting a peripheral device of a computer, as well as a network system, a server computer, and a client computer for the same purpose. The applications also include methods corresponding to the functions of such server computer and client computer, computer programs that cause the computer to attain these functions, recording media in which such computer programs are recorded, and data signals that include such computer programs and are embodied in carrier waves.

BRIEF DESCRIPTION OF THE DRAWINGS

FIG. 34 shows a linguistic information file;

DESCRIPTION OF THE PREFERRED EMBODIMENTS

Figure 1:
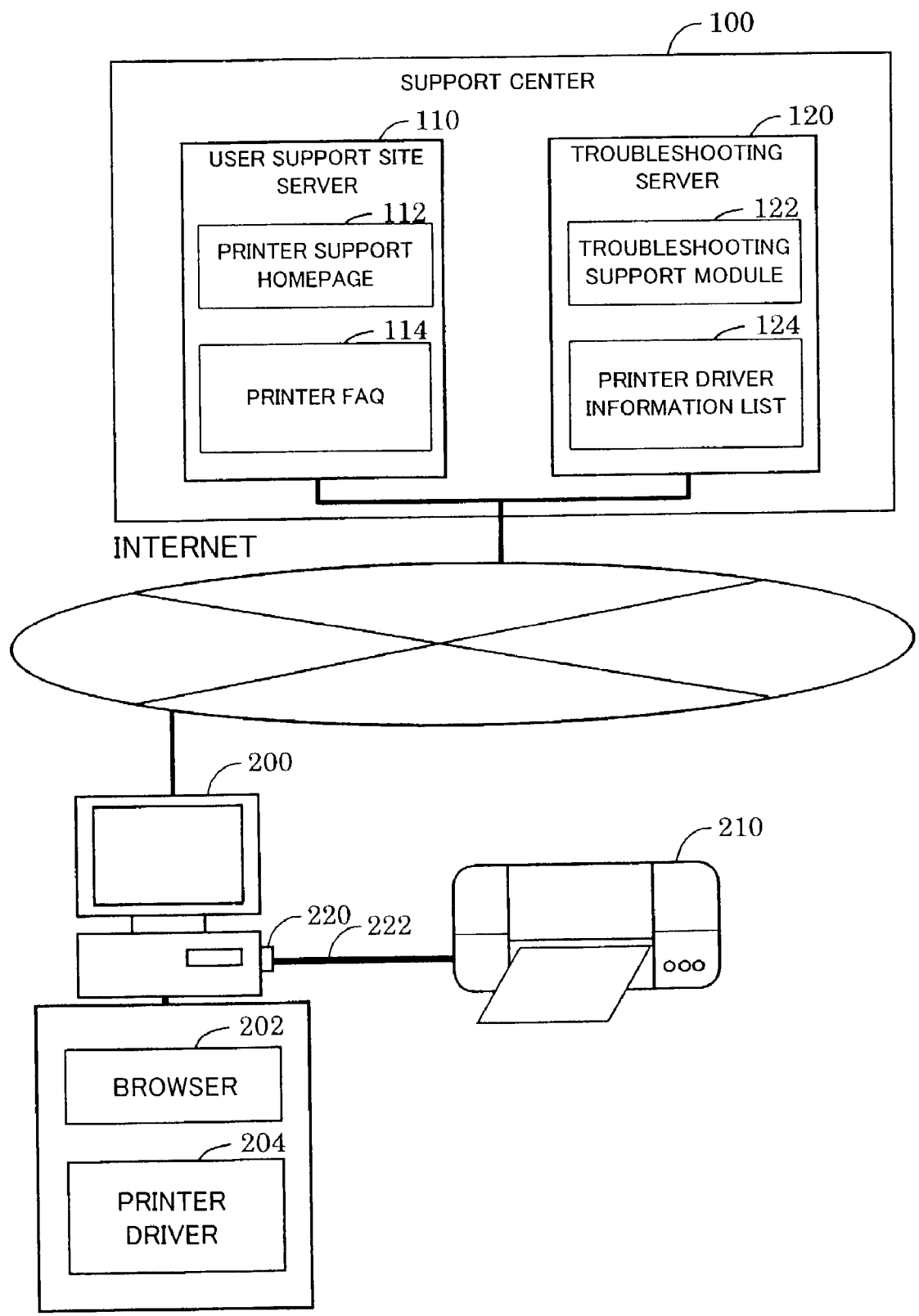
FIG. 1 illustrates the general construction of a user support system in one embodiment of the present invention.

A best mode of carrying out the present invention is discussed below as embodiments. FIG. 1 illustrates the general construction of a user support system in one embodiment of the present invention. This system includes a support center 100 and a client computer 200 connected with each other via the Internet.

The support center 100 has a user support site server 110 and a troubleshooting server 120. The user support site server 110 is a www server that provides information for users' support with regard to diverse peripheral devices including printers and scanners. The troubleshooting server 120 is utilized to troubleshoot the peripheral devices. These two servers 110 and 120 may be actualized on separate computer hardware or on identical computer hardware. The services of the two servers 110 and 120 may be provided by one identical server.

The two servers 110 and 120 store therein a variety of files and program modules for printer users' support. The user support site sever 110 stores therein various Web pages including a printer support homepage 112 and a printer FAQ page 114. The troubleshooting server 120 stores therein a troubleshooting support module 122 and a printer driver information list 124. The details of these files and modules will be discussed later.

A printer 210 is connected to the client computer 200 via a parallel port 220 and a cable 222. A browser 202 and a printer driver 204 are operable on the client computer 200. In the description hereafter, the client computer 200 may simply be referred to as 'client'.

Figure 2:
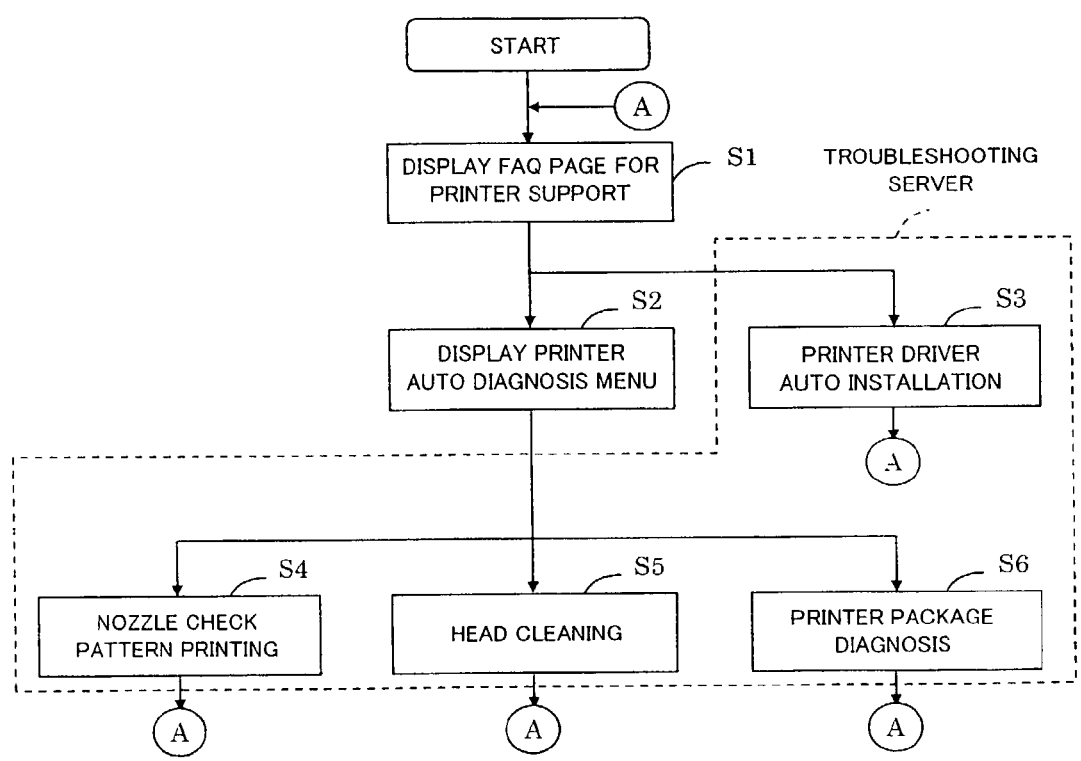
FIG. 2 is a flowchart showing a series of printer user support process provided by the support center 100.

FIG. 2 is a flowchart showing a series of printer user support process provided by the support center 100. At step S1, in response to a requirement from the client computer 200, the printer FAQ page 114 is transferred from the user support site server 110 to the client computer 200 and is displayed by the browser 202.

Figure 3:
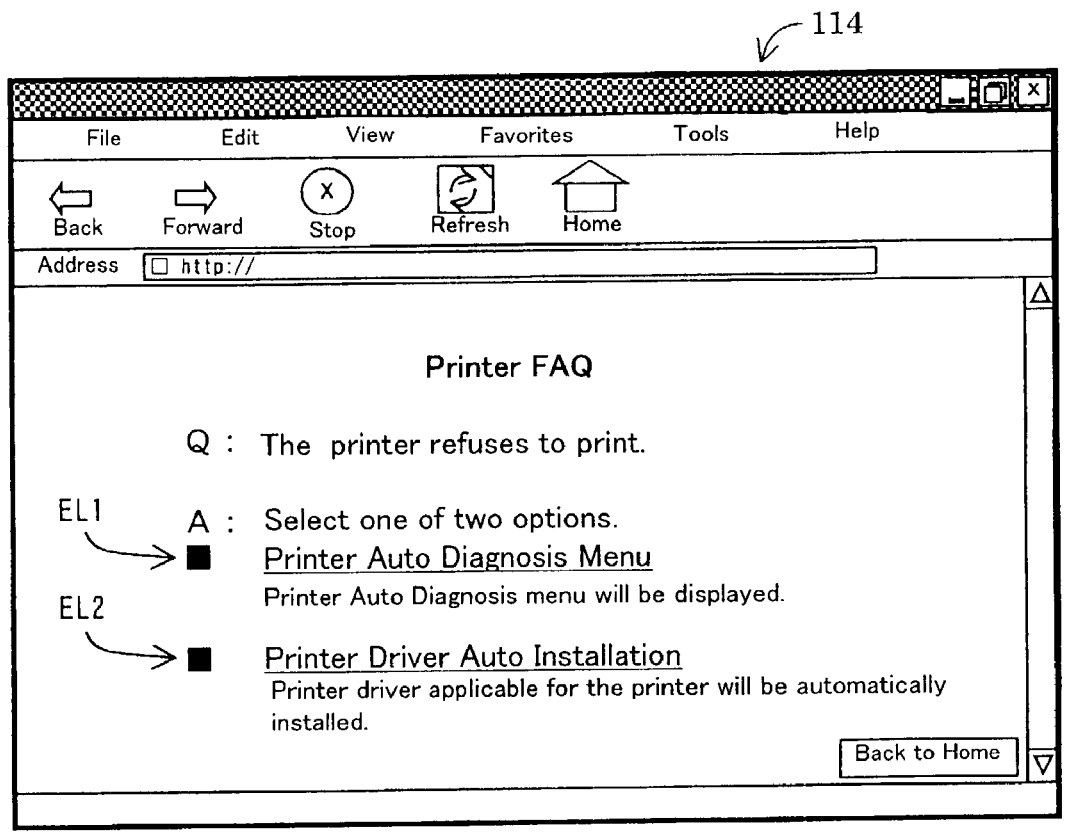
FIG. 3 shows a printer FAQ page 114.

FIG. 3 shows an example of the printer FAQ page 114. This is a Web page of FAQ (Frequently Asked Questions). On this Web page, a first element EL1 'Printer Auto Diagnosis Menu' and a second element EL2 'Printer Driver Auto Installation' are displayed in a selectable manner as possible measures to a problem 'Q: The printer refuses to print'.

In the specification hereof, the term 'element' represents one part arranged on a Web page (may simply be referred to as 'page') or a dialog (also referred to as 'dialog box'). The 'elements' include buttons, character strings, images, menus, and other various parts.

On the page of FIG. 3, when the user of the client computer 200 selects the first element EL1, a page including a Printer Auto Diagnosis menu is transferred from the server 110 to the client computer 200 and is displayed on the client computer 200 (step S2 in FIG. 2). When the user selects the second element EL2, on the other hand, auto installation of a printer driver is carried out (step S3). The auto installation of the printer driver will be discussed later.

Figure 4:
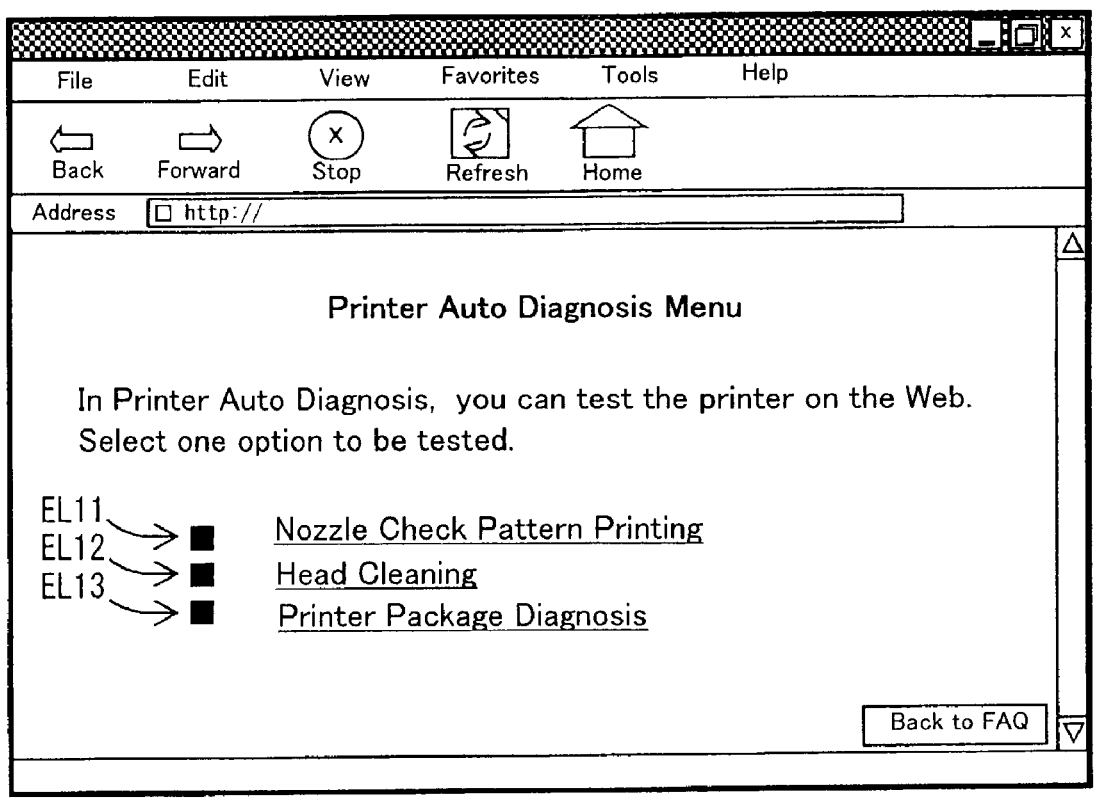
FIG. 4 shows an example of Printer Auto Diagnosis Menu.

FIG. 4 shows an example of Printer Auto Diagnosis Menu. On this page, a first element EL11 'Nozzle Check Patten Printing', a second element EL12 'Head Cleaning', and a third element EL13 'Printer Package Diagnosis' are displayed in a selectable manner. In response to selection of one of these elements, a corresponding troubleshooting procedure is carried out (steps S4 through S6 in FIG. 2).

The troubleshooting procedures of steps S3 through S5 are executed under support of the troubleshooting server 120. Namely the elements EL2 (FIG. 3) and EL11 through EL13 (FIG. 4), which are selected to start the corresponding troubleshooting procedures, are linked with the troubleshooting support module 122.

The following successively describes the details of the three troubleshooting procedures, that is, the nozzle check pattern printing (step S4), the printer package diagnosis (step S5), and the printer driver auto installation (step S3).

Figure 5:
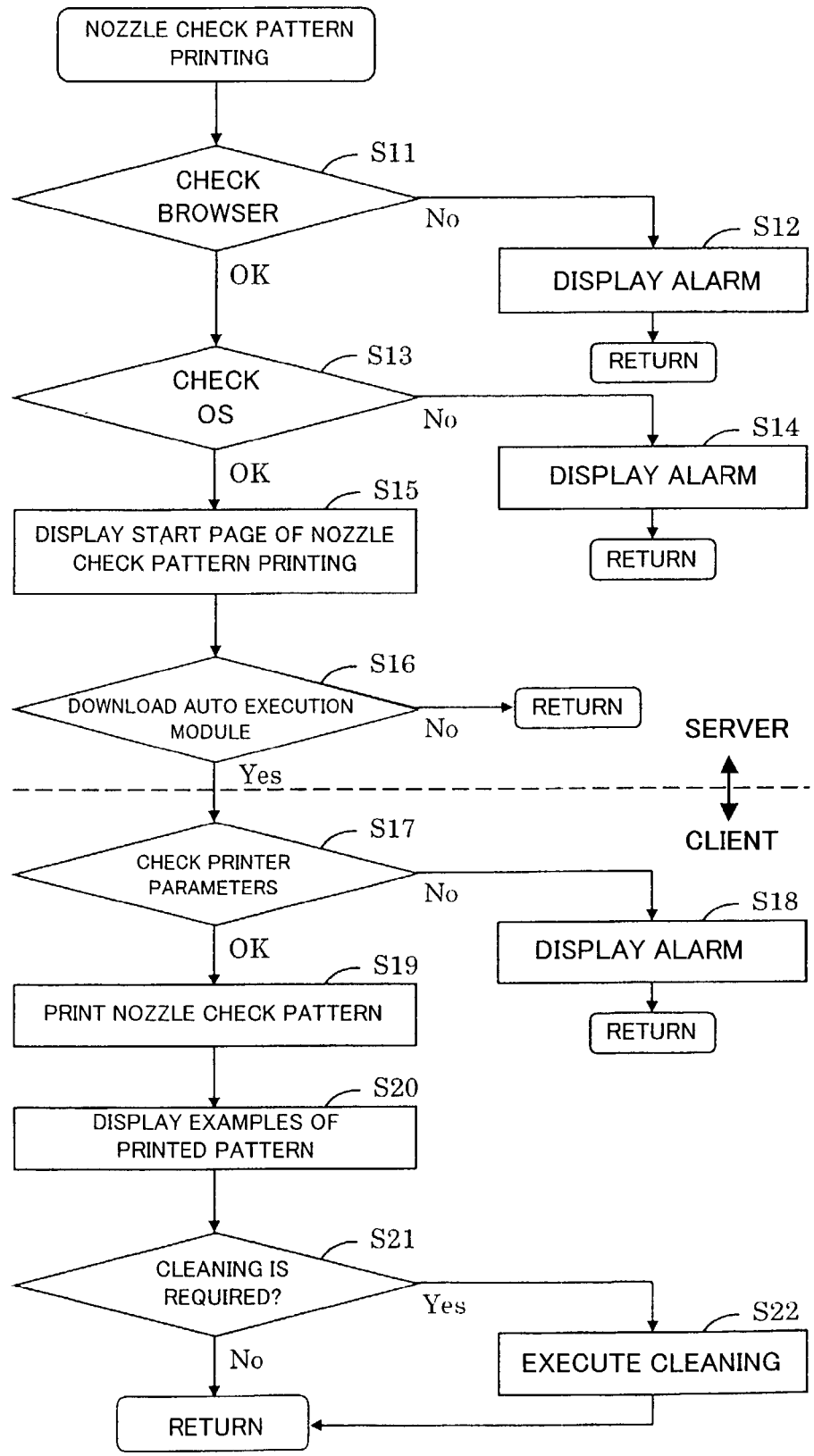
FIG. 5 is a flowchart showing a processing routine of printing a nozzle check pattern.

FIG. 5 is a flowchart showing a processing routine of printing a nozzle check pattern. Among steps S11 through S22 in FIG. 5, steps S11 through S16 are mainly executed by the troubleshooting server 120, whereas steps S17 through S22 are mainly executed by the client computer 20.

When the user selects the first element EL11 shown in FIG. 4, the troubleshooting support module 122 in the server 120 examines the specification and the version of the browser 202 (FIG. 1) and the specification and the version of the operating system used in the client computer 200 and determines whether or not these browser and operating system are the supporting target of troubleshooting (steps S11 and S13 in FIG. 5). The information on the browser 202 (FIG. 2) and the information on the operating system used in the client computer 200 are transferred by the browser 202 to the server 120 in response to selection of the element EL11.

Available examples of the browser 202 as the supporting target of troubleshooting include Internet Explorer (trade mark by Microsoft Corporation) version 4.01 and upper grade and Netscape Navigator (trade mark by Netscape Communications Corporation) version 4.0 and upper grade. Available examples of the operating system used in the client computer 200 include Windows 95 and Windows 98 (trade marks by Microsoft Corporation).

Figure 6:
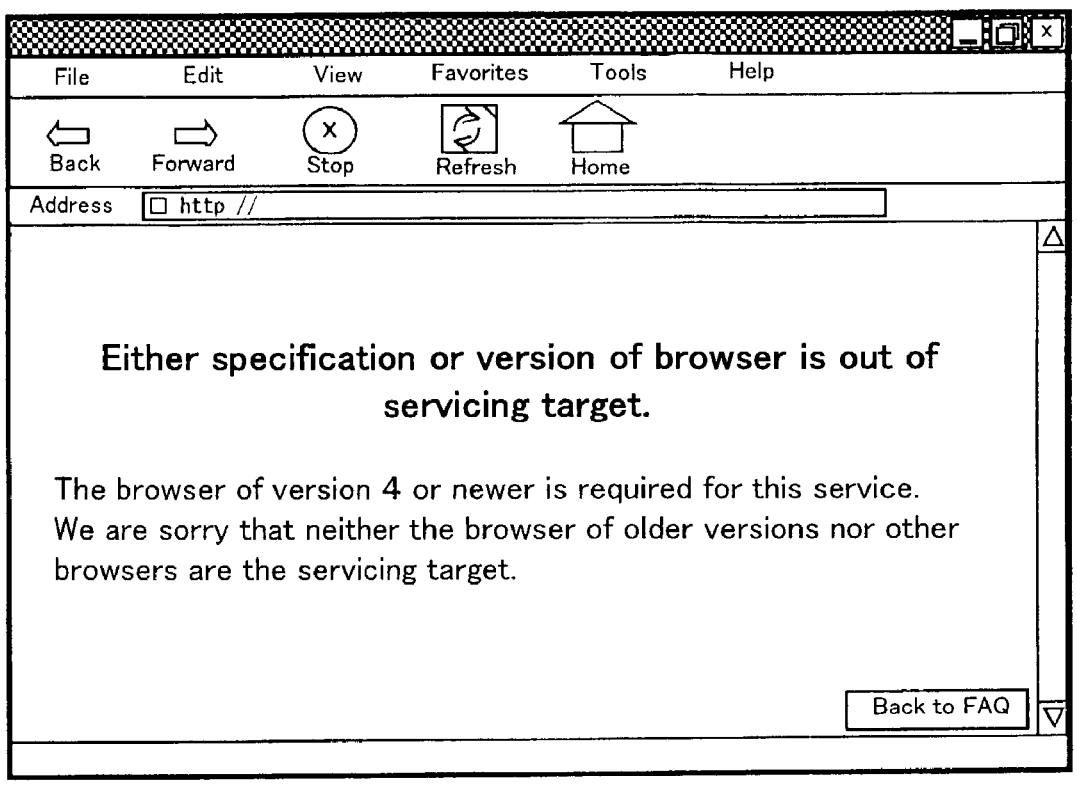
FIG. 6 shows an alarm page showing that the browser is out of the supporting target of troubleshooting.

When either the browser or the operating system is out of the supporting target of troubleshooting, an alarm representing the out-of-target is transferred from the server 120 to the client computer 200 and is displayed on the window of the client computer 200 (steps S12 and S14). FIG. 6 shows an example of the alarm page showing that the browser is out of the supporting target of troubleshooting.

The determination of whether or not the browser and the operating system are the supporting target of troubleshooting is performed at the start of the troubleshooting procedure. This arrangement stops the further progress of the troubleshooting procedure when either the browser or the operating system is out of the supporting target, thus preventing pointless processing in the server 120 and the client computer 200.

Figure 7:
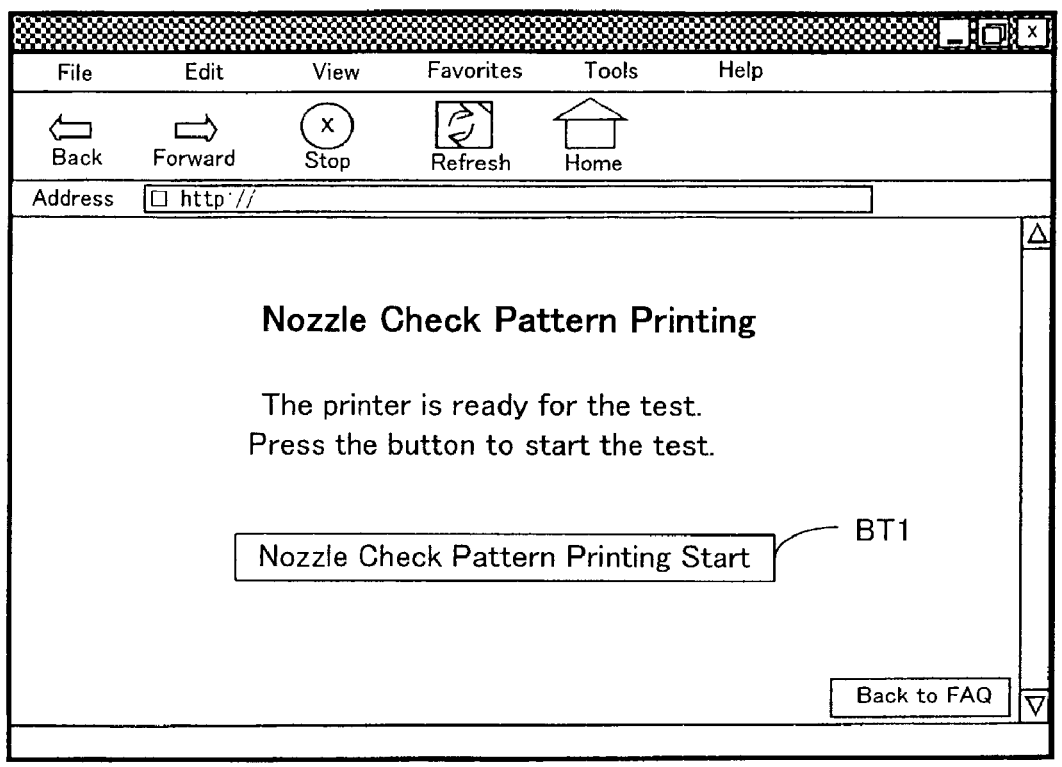
FIG. 7 shows a start page of nozzle check pattern printing.

When both the browser and the operating system are the supporting target, a start page of nozzle check pattern printing is transferred from the server 120 to the client computer 200 and is displayed (step S15) as shown in FIG. 7. This page includes a button BT1 'Nozzle Check Pattern Printing Start'. In response to a user's click of this button BT1, the client computer 200 requests the server 120 to transfer an auto execution module for nozzle check pattern printing. The troubleshooting support module 122 transfers the auto execution module to the client computer 200 based on the request (step S16).

Figure 8:
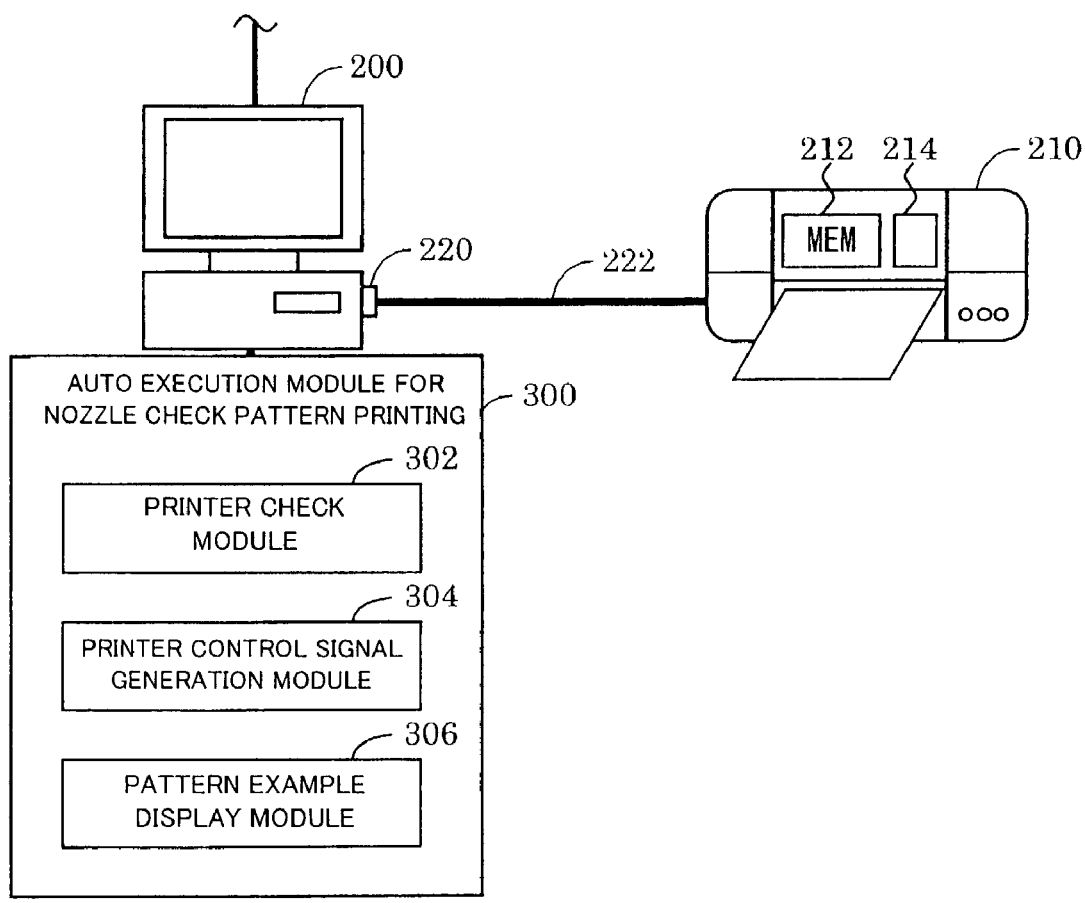
FIG. 8 is a block diagram showing the construction of an auto execution module 300 for nozzle check pattern printing.

FIG. 8 is a block diagram showing the construction of an auto execution module 300 downloaded to the client computer 200. This auto execution module 300 includes three modules, that is, a printer check module 302, a printer control signal generation module 304, and a pattern example display module 306. The division of the respective modules 302, 304, and 306 in the auto execution module 300 is only an example. The auto execution module 300 may be constructed in any different division. The auto execution module 300 may alternatively be constructed as one integral module. In the specification hereof, the term 'module' is synonymous with 'program', which is used in a wider sense including scripts.

The auto execution module 300 is automatically activated on completion of its download to the client computer 200. The auto execution module 300 is actualized, for example, by Active X control (trade mark by Microsoft Corporation).

In the case where the auto execution module 300 is actualized by the Active X control, the servers 110 and 120 may be constructed, for example, by Windows NT Server (trade mark by Microsoft Corporation) and IIS (Internet Information Server; trade mark by Microsoft Corporation). Available examples for the Web page include ASP (Active Server Pages; trade mark by Microsoft Corporation) and JSP (Java Server Pages; trade mark by Sun Microsystems Corporation). ASP and JSP are capable of readily creating dynamic pages. Combination of COM (Component Object Model; trade mark by Microsoft Corporation) components with ASP further facilitates creation of Web pages.

At step S17 in FIG. 5, the printer check module 302 checks the following parameters of the printer 210: (1) type of the printer 210; (2) communications error (first error status); (3) paper jam error (second error status); (4) out-of-paper error (third error status); (5) out-of-ink error (fourth error status); (6) fatal error (fifth error status); and (7) maintenance error (sixth error status).

The parameter (1) is specified by reading a vender ID and a product ID (device ID) registered in the memory 212 (FIG. 8) of the printer 210. The parameters (2) through (7) showing the various error statuses of the printer are examined by reading error information stored in the memory 212. The error information is set by a non-illustrated control circuit in the printer 210. The status 'communications error' represents failure of connection between the client computer 200 and the printer 210. The status 'fatal error' represents a critical error, which requires the printer 210 to be sent to a maker's service center. The status 'out-of-ink' may be detected by the remaining quantity of ink stored in the memory 214, which is located in an ink cartridge (not shown) set in the printer 210. The status 'maintenance error' means that the timing of maintenance of the printer 210 is coming.

In the process of checking the parameters (1) through (7), the printer control signal generation module 304 first transmits a control signal, which requires information on these parameters, to the printer 210, in response to an instruction given by the printer check module 302. When the printer 210 sends back the required information on these parameters, the printer check module 302 interprets the information and examines the parameters (1) through (7).

Transmission of the control signal to the printer 210 is not via the printer driver 204 but is executed by the printer control signal generation module 304. Such transmission is allowed since the printer 210 is directly linked with the external interface (parallel port 220) of the client computer 200. In the case where the client computer 200 is linked with the printer 210 via a network like a LAN, similar transmission is allowed under the setting of a protocol for receiving and transmitting the control signals via the network.

Figure 9:
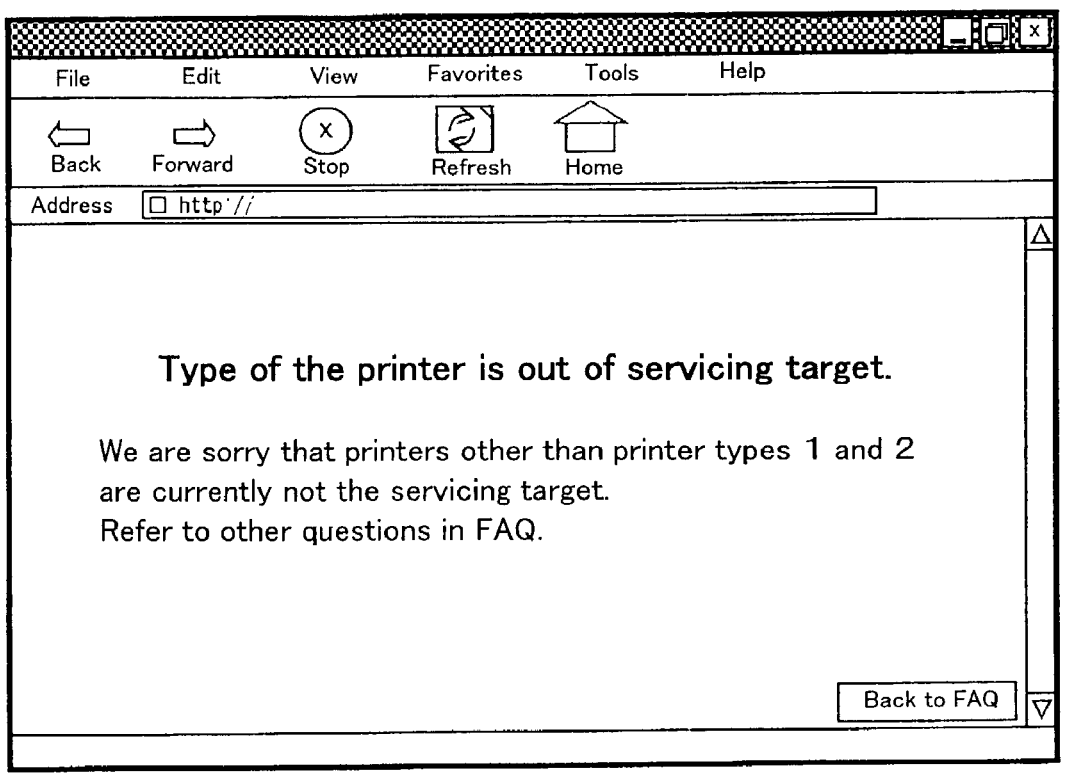
FIG. 9 shows an example of the Web page informing the user of the problem that the type of the printer is out of the supporting target of troubleshooting.
Figure 10:
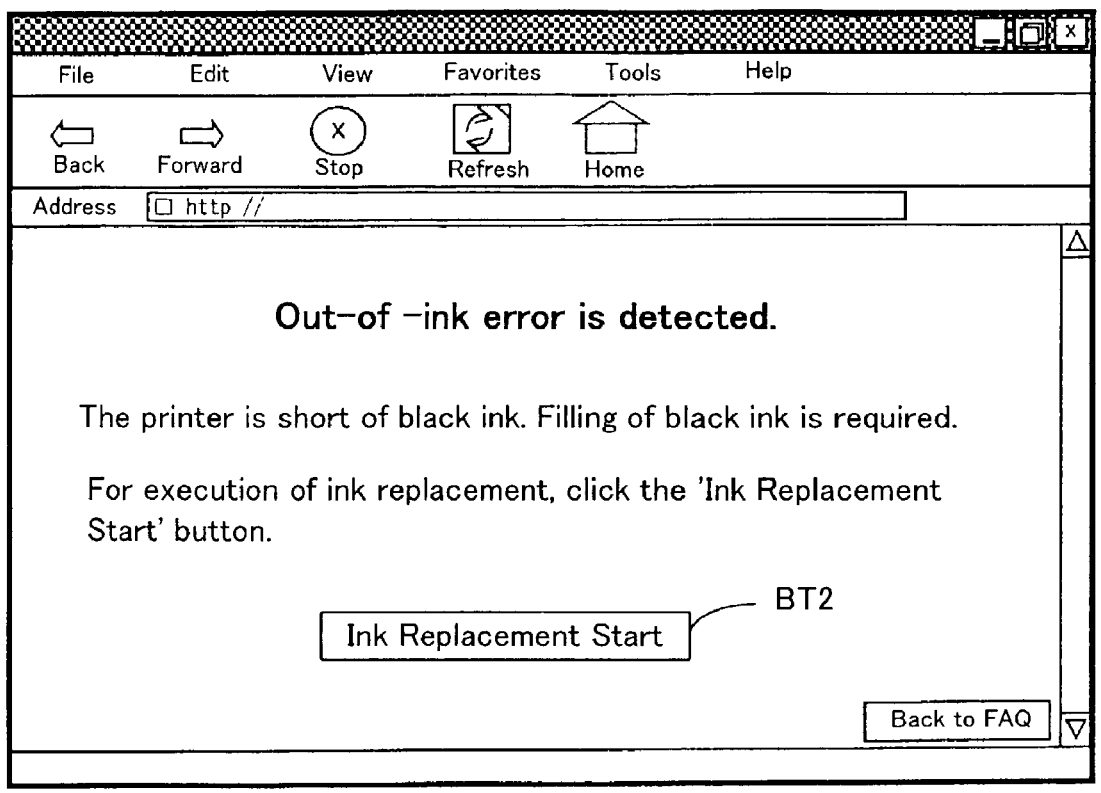
FIG. 10 shows an example of the Web page informing the user of the problem that the out-of-ink status is detected.

When a result of the above examination shows that any of the parameters has a problem, a Web page or a dialog is displayed on the window of the client computer 200 to give an alarm representing the problem (step S18 in FIG. 5). FIG. 9 shows an example of the Web page informing the user of the problem that the type of the printer is out of the supporting target of troubleshooting. FIG. 10 shows an example of the Web page informing the user of the problem that the out-of-ink status is detected. The page shown in FIG. 10 includes a button BT2 'Ink Replacement Start'. When the user clicks the button BT2, a control signal representing a start of ink replacement is transmitted from the printer control signal generation module 304 to the printer 210. The printer 210 starts an ink replacement procedure in response to the control signal. A carriage (not shown) with an ink cartridge mounted thereon is shifted to the approximate center of the printer 210, which allows the user to replace the ink cartridge. The printer 210 works in the same manner when the user manually presses a push button for starting ink replacement located on the front face of the printer 210.

As clearly understood from this example of the out-of-ink error, in the arrangement of the embodiment, when an error status is detected according to the error information stored in the printer 210, a Web page or a dialog including an element (for example, the button BT2 in FIG. 10) to start the troubleshooting procedure for recovery of the error status is displayed on the window of the client computer 200. The user clicks the displayed element and causes the printer 210 to carry out a required series of operations for canceling the error status of the printer 210.

According to the type of the error status, the printer 210 can not implement a required series of operations to cancel the error status. For example, in the case of a communications error, transmission of the control signal to the printer 210 does not lead to cancel of the error status. In such cases, the type of the error status is displayed on the window of the client computer 200, but an element for starting operations to cancel the error status is not included in the display. It is, however, preferable to display some statement or illustration showing required operations to cancel the error status. Such display notifies the user of the current error status of the printer 210 and enables the user to perform the required operations to eliminate the cause of the trouble arising in the printer 210.

Checking the printer type and the error status is all performed on the client computer 200. There is accordingly no need of transmitting information regarding the printer type and the error status to the server 110 and 120. The information on the printer type and the error status are regarded as individual information representing the working environment of the printer 210 by the user. No need of transmitting such individual information to the servers 110 and 120 is of great advantage.

In the case where no problem is found with regard to any parameters checked, a control signal to start printing a nozzle check pattern is supplied from the printer control signal generation module 304 to the printer 210 (step S19 in FIG. 5). The printer 210 then prints a predetermined nozzle check pattern in response to the control signal. The nozzle check pattern is stored in the memory 212 of the printer 210. Receiving the control signal to start printing the nozzle check pattern, the printer 210 prints the nozzle check pattern stored in the memory 212. In one possible modification, print data of the nozzle check pattern may be included in the printer check module 302, and the printer 210 prints the nozzle check pattern based on the print data. This modified arrangement enables arbitrary setting of the nozzle check pattern. In another possible modification, the printer driver 204 may have the nozzle check pattern function. In this case, the printer driver 204 causes the printer 210 to print the nozzle check pattern. On completion of printing the nozzle check pattern, a signal representing completion of printing is transmitted from the printer 210 to the client computer 200. In response to this signal, the pattern example display module 306 displays a Web page or a dialog including printed examples of the nozzle check pattern (step S20).

Figure 11:
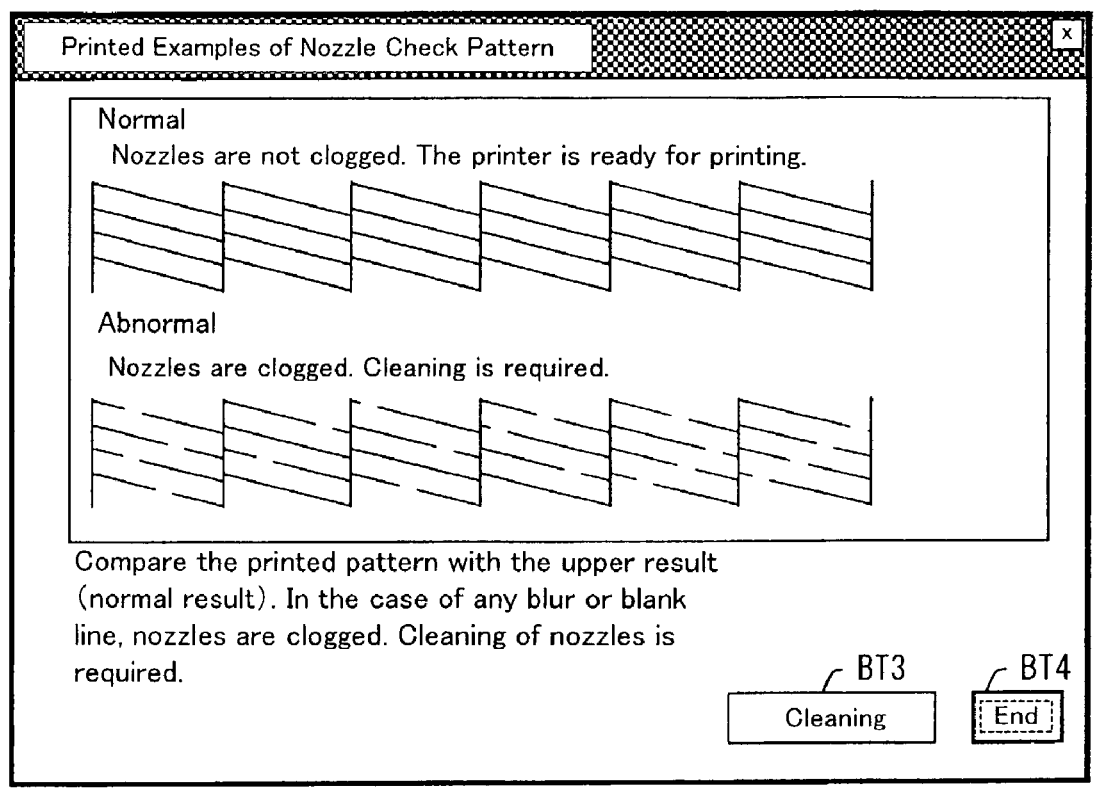
FIG. 11 shows a dialog including printed examples of a nozzle check pattern.

FIG. 11 shows a dialog including printed examples of a nozzle check pattern. This dialog includes display of a normal example of a printed nozzle check pattern and an abnormal example of the printed nozzle check pattern. The dialog also includes a button BT3 'Cleaning' and a button BT4 'End'. When the user clicks the 'Cleaning' button BT3, a control signal to start a cleaning operation is transmitted from the printer control signal generation module 304 to the printer 210. The printer 210 starts the cleaning operation of the nozzles in response to the control signal (steps S21 and S22). This eliminates clogging of the nozzles and restores the printer 210 to its normal working status.

When the user clicks the 'End' button BT4 on the window of FIG. 11, on the other hand, the program concludes the processing routine of FIG. 5. A predetermined Web page, such as the page of FIG. 3 or the top page of FAQ, is transferred from the server 110 to the client computer 200 and is displayed on the client computer 200. After conclusion of the processing shown in FIG. 5, the auto execution module 300 for nozzle check pattern printing transferred to the client computer 200 remains in the client computer 200 unless the user carries out operations for uninstallation. At the next time of selection of the element EL11 'Nozzle Check Pattern Printing' shown in FIG. 4, download of the auto execution module 300 for nozzle check pattern printing is not required. The existing auto execution module 300 for nozzle check pattern printing downloaded in advance is used to print the nozzle check pattern. In the case of any modification of the auto execution module 300 for nozzle check pattern printing, however, the modified auto execution module 300 for nozzle check pattern printing is newly downloaded for execution.

According to the processing routine of FIG. 5, when the user clicks the element (the button BT1) on the Web page (FIG. 7) to start printing the nozzle check pattern, the auto execution module 300 (FIG. 8) is downloaded from the troubleshooting server 120 (FIG. 1) to the client computer 200. The auto execution module 300 then supplies the control signal to the printer 210 and causes the printer 210 to start printing the nozzle check pattern. Only the user's simple click of the predetermined element on the Web page accordingly causes the printer 210 to carry out operations for printing the nozzle check pattern. This arrangement does not require the user to refer to the instructions manual of the printer 210 and operate required buttons of the printer 210 or to operate the printer utility on the client computer 200, but readily proposes an effective measure to a problem or trouble arising in the printer 210.

As shown in FIG. 11, on completion of printing the nozzle check pattern, a normal result and an abnormal result are displayed in a distinctive manner on the window of the client computer 200. The user readily determines the current status of nozzles by comparing the printed result with the display. This window includes the element (cleaning button BT3) to start the required troubleshooting procedure in the case of an abnormal result. The user thus advantageously causes the client computer 200 and the printer 210 to immediately execute the required troubleshooting procedure by a simple click of this element.

When the user clicks the second element EL12 on the window shown in FIG. 4, head cleaning is carried out for troubleshooting. The procedure of heading cleaning is similar to the procedure of FIG. 5. In the procedure of head cleaning, however, a cleaning operation is carried out instead of the nozzle check pattern printing at step S19 in FIG. 5, and the processing of steps S20 through S22 is not required. The process of printing the nozzle check pattern may be added to the head cleaning operation. In this modified arrangement, on completion of the head cleaning operation, a page or a dialog including notification of the complete head cleaning and an element to start printing the nozzle check pattern may be displayed on the window of the client computer 200. In response to a click of the element to start printing the nozzle check pattern, the processing of steps S19 through S22 in the flowchart of FIG. 5 is additionally executed.

Figure 12:
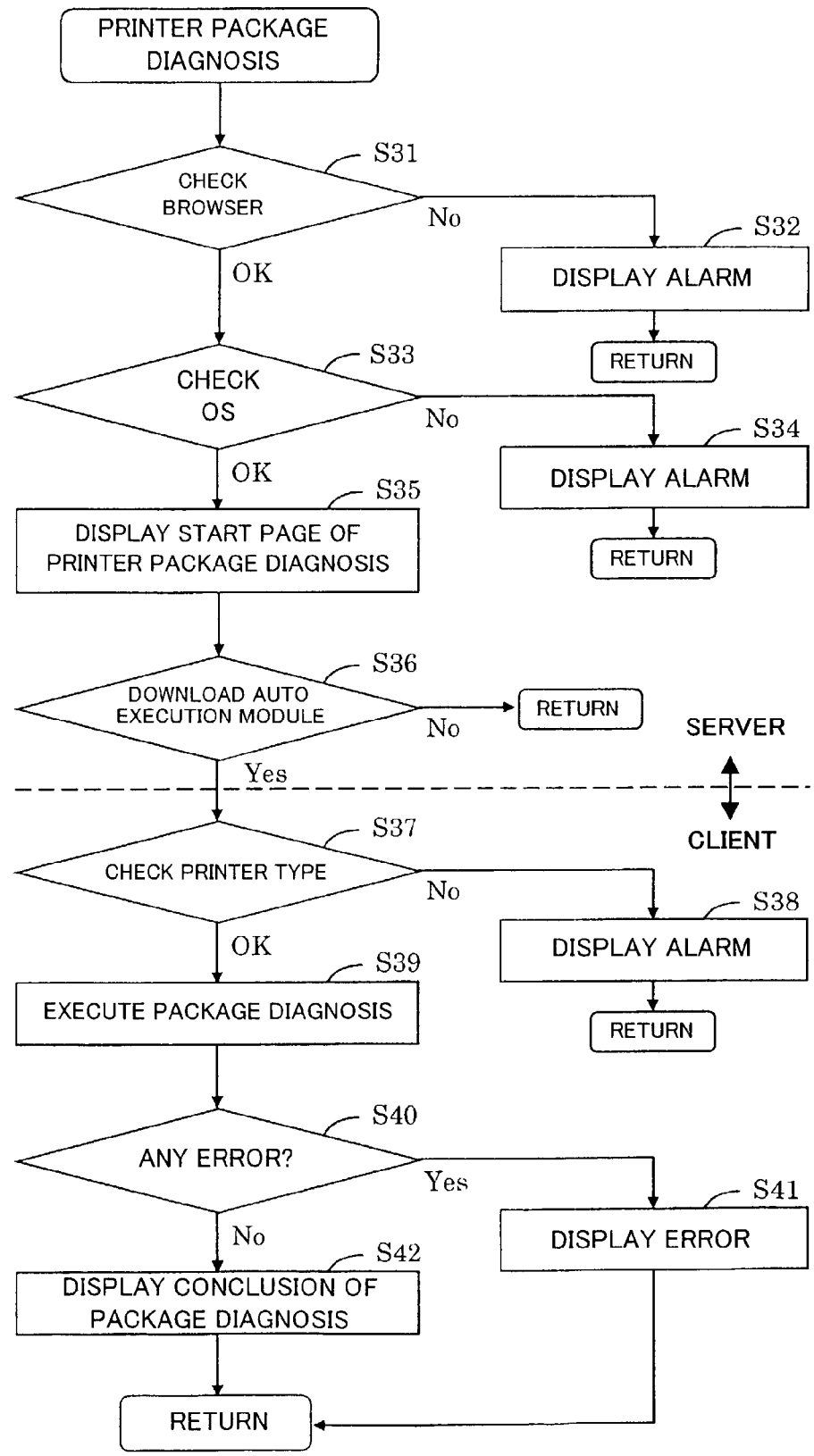
FIG. 12 is a flowchart showing a processing routine of printer package diagnosis.
Figure 13:
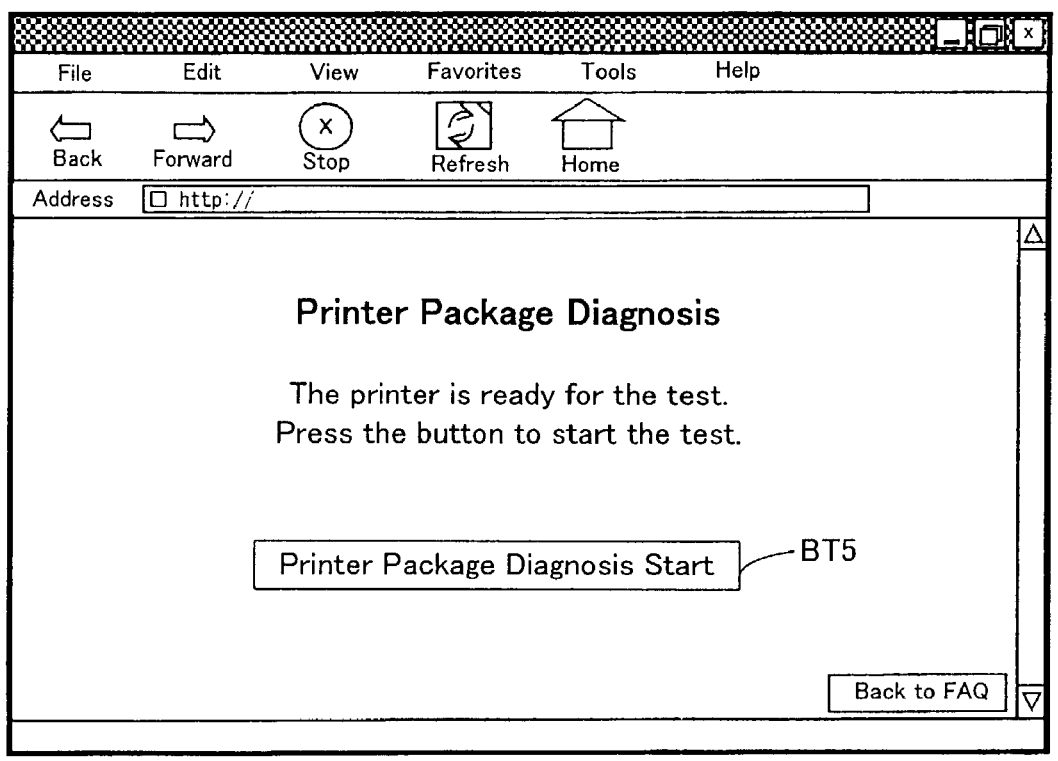
FIG. 13 shows a start page of printer package diagnosis.

FIG. 12 is a flowchart showing a processing routine of printer package diagnosis. The program enters this processing routine when the user clicks the third element EL12 on the window shown in FIG. 4. The processing of steps S31 through S34 in FIG. 12 is identical with the processing of steps S11 through S14 in FIG. 5. At step S35, a start page of printer package diagnosis shown in FIG. 13 is transferred from the server 120 to the client computer 200 and is displayed on the client computer 200. When the user clicks a button BT5, the troubleshooting support module 122 (FIG. 1) of the server 120 transfers an auto execution module for printer package diagnosis to the client computer 200 (step S36).

Figure 14:
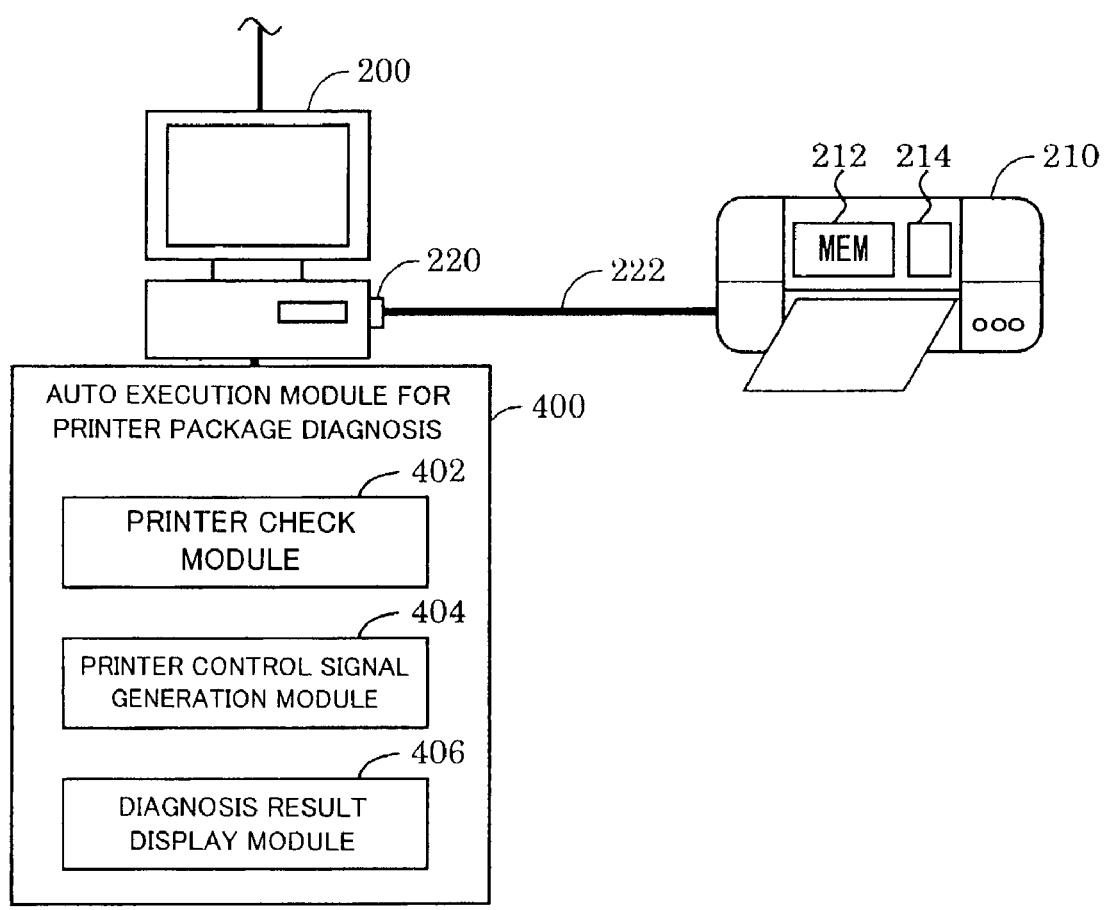
FIG. 14 is a block diagram showing the construction of an auto execution module 300 for printer package diagnosis.

FIG. 14 is a block diagram showing the construction of an auto execution module 400 downloaded to the client compute 200. This auto execution module 400 includes a printer check module 402, a printer control signal generation module 404, and a diagnosis result display module 406. The auto execution module 400 is automatically activated on completion of its download to the client compute 200.

At subsequent step S37, the printer check module 402 detects the type of the printer 210. When the printer 210 is not the target of printer package diagnosis, an alarm showing that the printer is out of the target is displayed (step S38).

At step S39, the printer check module 402 executes package diagnosis of the printer 210. The objects of the package diagnosis are five parameters (2) through (6) showing the respective error statuses of the printer 210, among the six parameters examined at step S17 in FIG. 5. The package diagnosis may examine other additional parameters or omit some of these five parameters (2) through (6).

Figure 15:
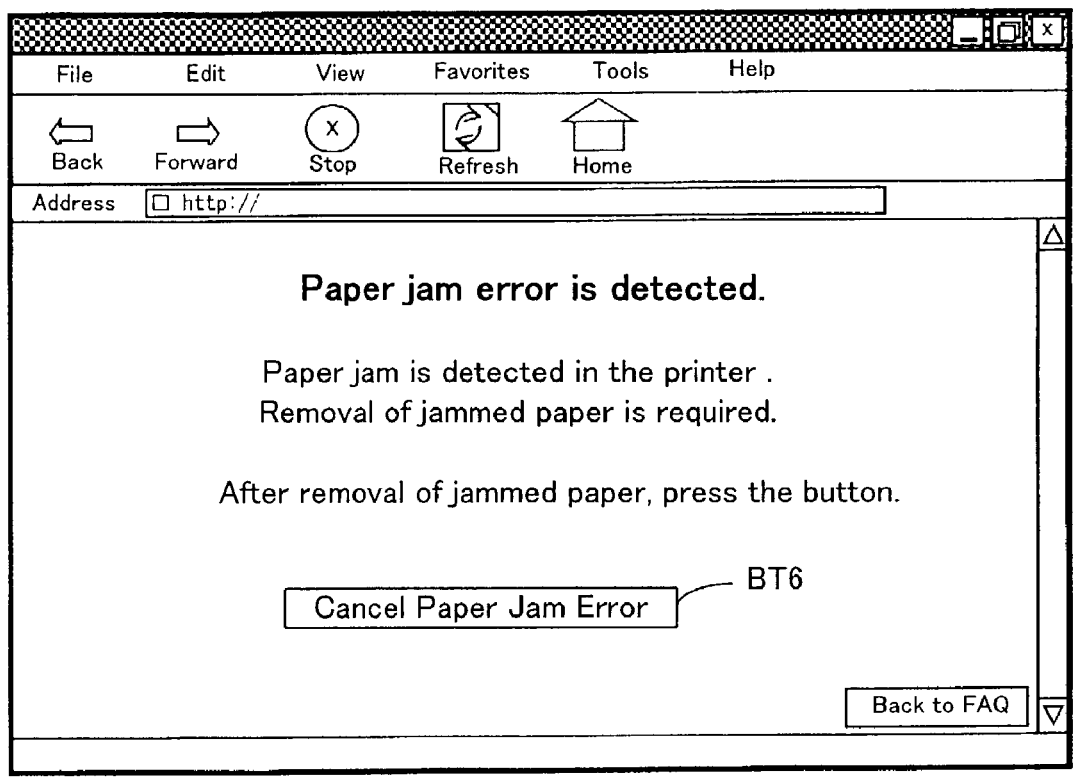
FIG. 15 shows a page that notifies the user of a detected paper jam error.

In the case where the printer 210 is in some error status, a Web page or a dialog for notifying the user of the error status is displayed on the window of the client computer 200 (step S41). FIG. 15 shows a page that notifies the user of the detected paper jam error as an example. This page includes a button BT6 'Cancel Paper Jam Error'.

When the user removes the jammed paper and clicks the button BT6 in FIG. 15, the printer control signal generation module 404 transmits a signal for canceling paper jam error information registered in the memory 212 of the printer 210 to the printer 210 via the parallel port 220. The printer 210 is accordingly restored to the normal state that is ready for printing. In the case of an out-of-ink error, the page shown in FIG. 10 is displayed on the window of the client computer 200.

Figure 16:
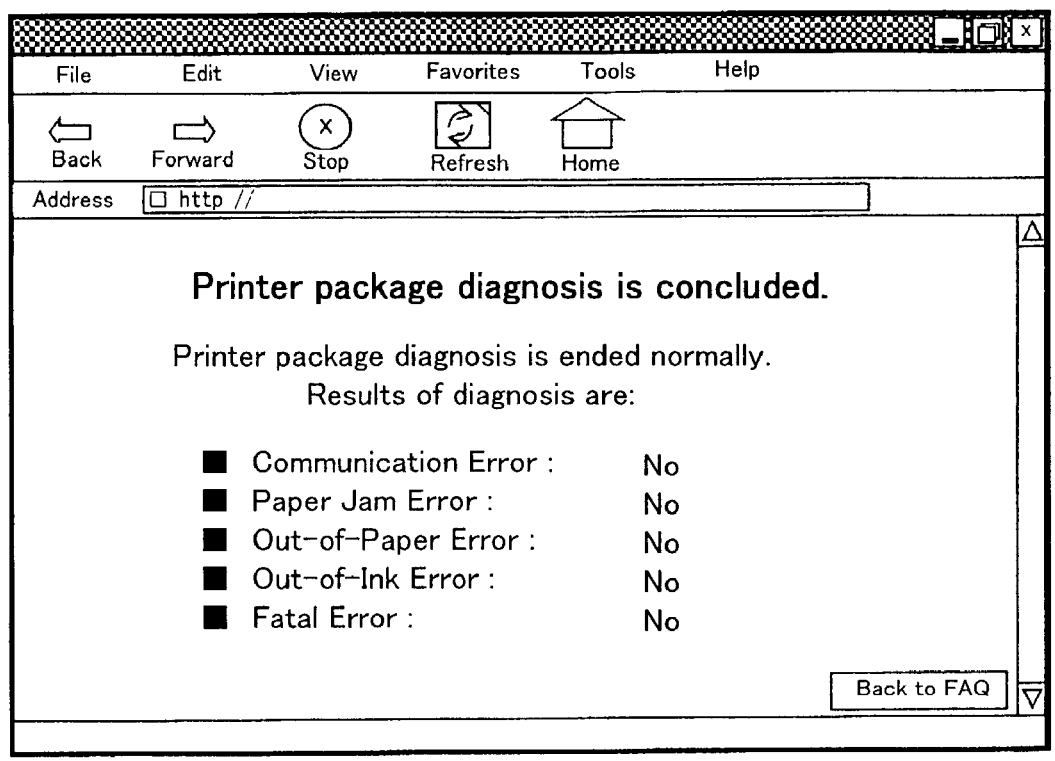
FIG. 16 shows a page that notifies the user of conclusion of printer package diagnosis.

When no error is detected at step S40 in FIG. 12, on the other hand, a Web page or a dialog that notifies the user of conclusion of printer package diagnosis is displayed (step S42). FIG. 16 shows a page that notifies the user of conclusion of printer package diagnosis as an example. In this example, the display shows detection of no error.

In the printer package diagnosis, when the user clicks the element EL12 for execution of package diagnosis in the Web page (FIG. 4), the auto execution module 400 is downloaded from the server 120 to the client computer 200. The auto execution module 400 carries out diagnosis to determine the presence or absence of any error status with regard to the printer 210. When there is any trouble arising in the printer 210, the user is readily informed of the detains of the trouble by simply clicking the element EL12. In the case of detection of some trouble or problem, the display includes an element for executing a corresponding troubleshooting procedure. The trouble or problem can thus be readily eliminated by the user's simple click of the element.

Figure 17:
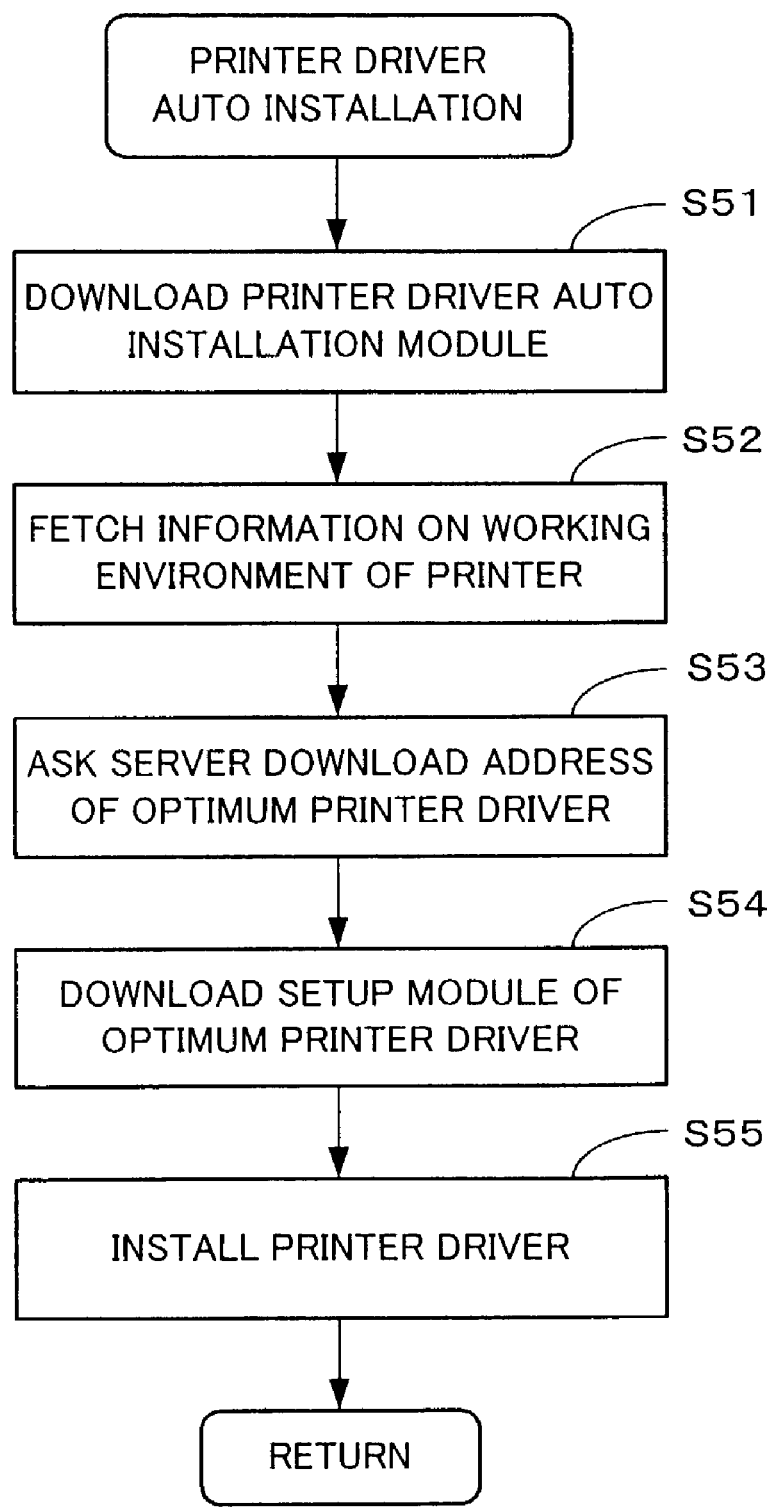
FIG. 17 is a flowchart showing a processing routine of auto installation of a printer driver.

FIG. 17 is a flowchart showing a processing routine of auto installation of a printer driver. The program enters this processing routine when the user clicks the second element EL2 in the window of FIG. 3.

Figure 18:
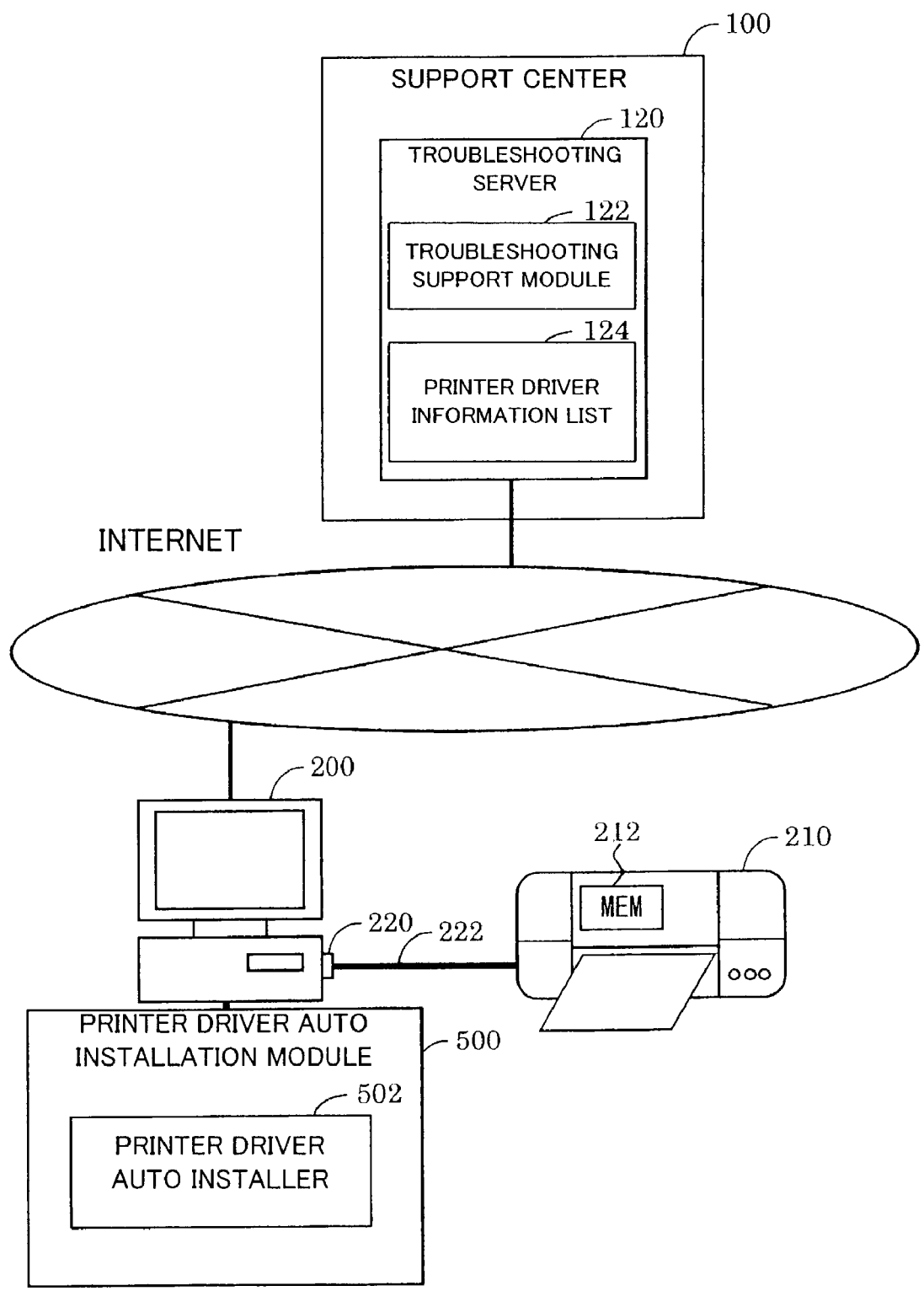
FIG. 18 is a block diagram showing the construction of an auto installation module 500 at the time of starting auto installation of a printer driver.

At step S51, a printer driver auto installation module is downloaded from the troubleshooting server 120 to the client computer 200. FIG. 18 is a block diagram showing the construction of a printer driver auto installation module 500 downloaded to the client computer 200. This auto installation module 500 has a printer driver auto installer 502. The auto installer 502 is automatically activated on completion of its download to the client computer 200. The auto installer 502 is also actualized by the Active X control (trade mark by Microsoft Corporation).

At subsequent step S52, the auto installer 502 fetches information on the working environment of the printer 210. The information on the working environment of the printer 210 represents the information used to select the printer driver applicable for the printer 210, and includes (1) the type of the printer 210; (2) the type and the version of the operating system used in the client computer 200; and (3) the version of the printer driver 204 (FIG. 1) installed in the client computer 200.

The type of the printer 210 is read from the memory 212 in the printer 210. The information regarding the operating system of the client computer 200 and the printer driver 204 are obtained from the system information and the registry of the client computer 200.

The auto installer 502 transmits the fetched information on the working environment of the printer to the troubleshooting server 120, and asks the server 120 a download address of the optimum printer driver for the printer 210 (step S53). The troubleshooting support module 122 refers to a printer driver information list 124 (FIG. 18) based on the transmitted information on the working environment of the printer and selects the optimum printer driver for the printer 21 0. A mapping of the working environment of the printer to the latest version of the printer driver and locations of storage of the printer drivers in the server 120 are registered in the printer driver information list 124. The troubleshooting support module 122 refers to this printer driver information list 124 and selects the optimum printer driver for the printer 210. The troubleshooting support module 122 returns the download address of the selected optimum printer driver to the auto installer 502.

At subsequent step S54, the auto installer 502 gains access to the download address transmitted from the troubleshooting support module 122 and downloads a module (setup module) for installation of the optimum printer driver. In one preferable application, when the optimum printer driver for the printer 210 is identical with the installed printer driver 204 (FIG. 1), a dialog for asking the user whether or not the installed printer driver is to be overwritten is displayed, prior to the start of download of the setup module. When the version of the optimum printer driver for the printer 210 is upper grade than the version of the installed printer driver 204 (FIG. 1), a dialog for asking the user whether or not the upper grade version of the printer driver is to be installed may be displayed, prior to the start of download of the setup module.

In the description hereafter, first-time installation of the printer driver into the client computer 200 and installation for updating the existing printer driver to a latest version are referred to as 'new installation'. Re-installation of the same printer driver as the existing printer driver installed in the client computer 200 is referred to as 'overwriting installation'.

Figure 19:
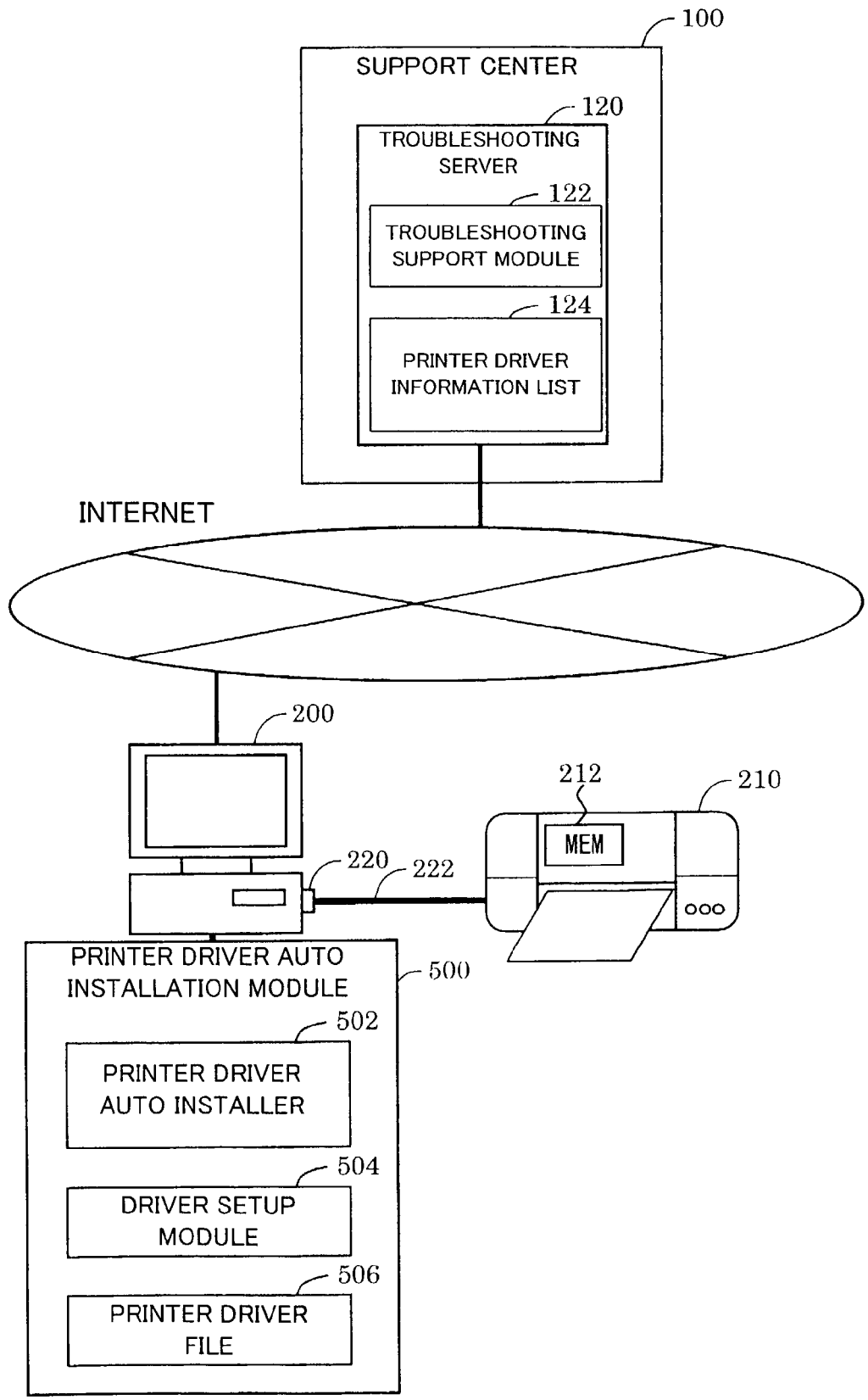
FIG. 19 is a block diagram showing the construction of the auto installation module 500 after download of a printer driver setup module.

FIG. 19 shows the construction of the auto installation module 500 after download of the setup module. The construction of FIG. 19 includes a driver setup module 504 and a printer driver file 506, in addition to the construction of the auto installation module 500 shown in FIG. 18. The driver setup module 504 is an execution file (EXE file) used for installation of the printer driver in the client computer 200. The printer driver file 506 is the optimum printer driver for the printer 210.

The combination of the driver setup module 504 with the printer driver file 506 corresponds to the 'driver setup program' of the present invention.

On completion of download of these module and file 504 and 506, the auto installer 502 activates the driver setup module 504. The driver setup module 504 carries out a series of processing to install the printer driver file 506 into the client computer 200 at step S55. For example, in the case of new installation, the series of processing executed includes uninstallation of the existing printer driver, installation of a new printer driver, and reactivation of the client computer 200. In the case of overwriting installation, the series of processing executed include installation of a new printer driver and reactivation of the client computer 200. In a general application, a dialog for asking the user whether or not reactivation is to be executed immediately is displayed prior to the actual reactivation.

The auto installer 502 of the printer driver controls the processing flow of steps S51 through S54 to download the optimum printer driver for the printer 210 and the corresponding driver setup module 504 and activate the driver setup module 504. This arrangement enables the printer driver applicable for the printer 210 to be readily installed, while only requiring the user to answer some simple inquiry according to the requirements after a click of the element EL2 shown in FIG. 3. The arrangement thus advantageously enables the user to install the optimum printer driver without specifying the type of the printer 210, the operating system used in the client computer 200, and the version of the currently used printer driver.

In the structure of the embodiment, information regarding the printer drivers applicable for diverse printers is collectively registered in the printer driver information list 124 in the server 120. The management representative of the support center 100 is only required to update this information list 124, in order to provide the user with the latest printer driver. The arrangement of the embodiment thus advantageously facilitates management of the information required for supporting download of the optimum printer driver for each type of the printer.

According to the processing routine of FIG. 17, after selection of the optimum printer driver, the corresponding driver setup module 504 and the printer driver file 506 are downloaded from the server 120 to the client computer 200. Another advantage of the embodiment is thus to reduce the quantity of data in the downloaded file.

In the embodiment discussed above, the printer 210 is the peripheral device specified as the supporting target. Any of other diverse peripheral devices including scanners and external storage devices may also be specified as the supporting target. The technique of the embodiment is also applicable to troubleshooting of a home appliance (for example, a microwave oven or a video cassette recorder), which internally has computer functions and is connectable with the Internet, and to auto installation of some programs into the home appliance.

In the embodiment, the parallel port 220 and the cable 222 are used as the external interfaces. Any of other external interfaces, such as a USB port or an infrared interface, may be utilized for connection of a peripheral device with the client computer.

In the case where the peripheral device as the supporting target is connectable with multiple external interfaces (for example, a parallel port and a USB port) of the client computer 200, it is preferable to specify which external interface is connected with the peripheral device, prior to transfer of the control signal to the peripheral device. Such specification may be executed by, for example, the auto execution module of the troubleshooting procedure downloaded from the server 120 into the client computer 200.

The four troubleshooting procedures are explained in the above embodiment; the nozzle check pattern printing (the element EL11 in FIG. 4), the head cleaning (the element EL12), the printer package diagnosis (the element EL13), and the printer driver auto installation (the element EL2 in FIG. 3). They are, however, not restrictive, but the technique of the present invention is applicable to a diversity of other troubleshooting procedures.

In the example of the nozzle check pattern printing (FIGS. 5 and 8), the whole auto execution module 300 corresponds to the 'troubleshooting program' of the invention. In the example of the printer package diagnosis (FIGS. 12 and 14), the whole auto execution module 400 corresponds to the 'troubleshooting program' of the invention. In the example of the printer driver auto installation (FIGS. 17 and 19), the auto installer 502 corresponds to the 'peripheral device information fetching program' of the invention, and the setup module 504 corresponds to the 'troubleshooting program' of the invention. The information fetched by the peripheral device information fetching program should include at least the type of the peripheral device.

According to the processing routine of FIG. 17 with regard to the printer driver auto installation, when the information on the working environment of the printer is transmitted to the server 120 at step S53, the server 120 notifies the client computer 200 of the download address (storage location) of the optimum printer driver. The client computer 200 then gains access to the notified storage location at step S54. In one modified process applicable for this processing routine, when the information on the working environment of the printer is transmitted to the sever 120 at step S53, the driver setup module 404 including the optimum printer driver is transmitted from the server 120 to the client computer 200.

As clearly understood from this example, in general, in response to transmission of the peripheral device information from the client to the server, either of the following two procedures is applicable: (i) the server notifies the client of the storage location of the appropriate troubleshooting program and the client accesses the storage location based on the notification; and (ii) the client receives the troubleshooting program transferred immediately without being notified of the storage location of the troubleshooting program by the server.

In one possible modification, part of the functions of the client computer 200 in the above embodiment may be attained by either of the servers 110 and 120. Part of the functions of the servers 110 and 120 may, on the contrary, be attained by the client computer 200.

In the arrangement of the embodiment, the printer auto diagnosis and the printer driver auto installation are proposed as the possible measures to the problem 'The printer refuses to print' in the printer FAQ shown in FIG. 3. On conclusion of the printer auto diagnosis or the printer driver auto installation, a predetermined Web page, such as the page shown in FIG. 3 or the top page of the FAQ, is displayed. Another application may continue the FAQ with regard to the result of the printer auto diagnosis or the printer driver auto installation. The applicable of continuing the FAQ based on the result of the printer auto diagnosis is discussed below as a second embodiment. The description of the second embodiment mainly regards the FAQ in relation to the printer auto diagnosis, and the construction and the arrangement in relation to the printer driver auto installation are not specifically described here.

Figure 20:
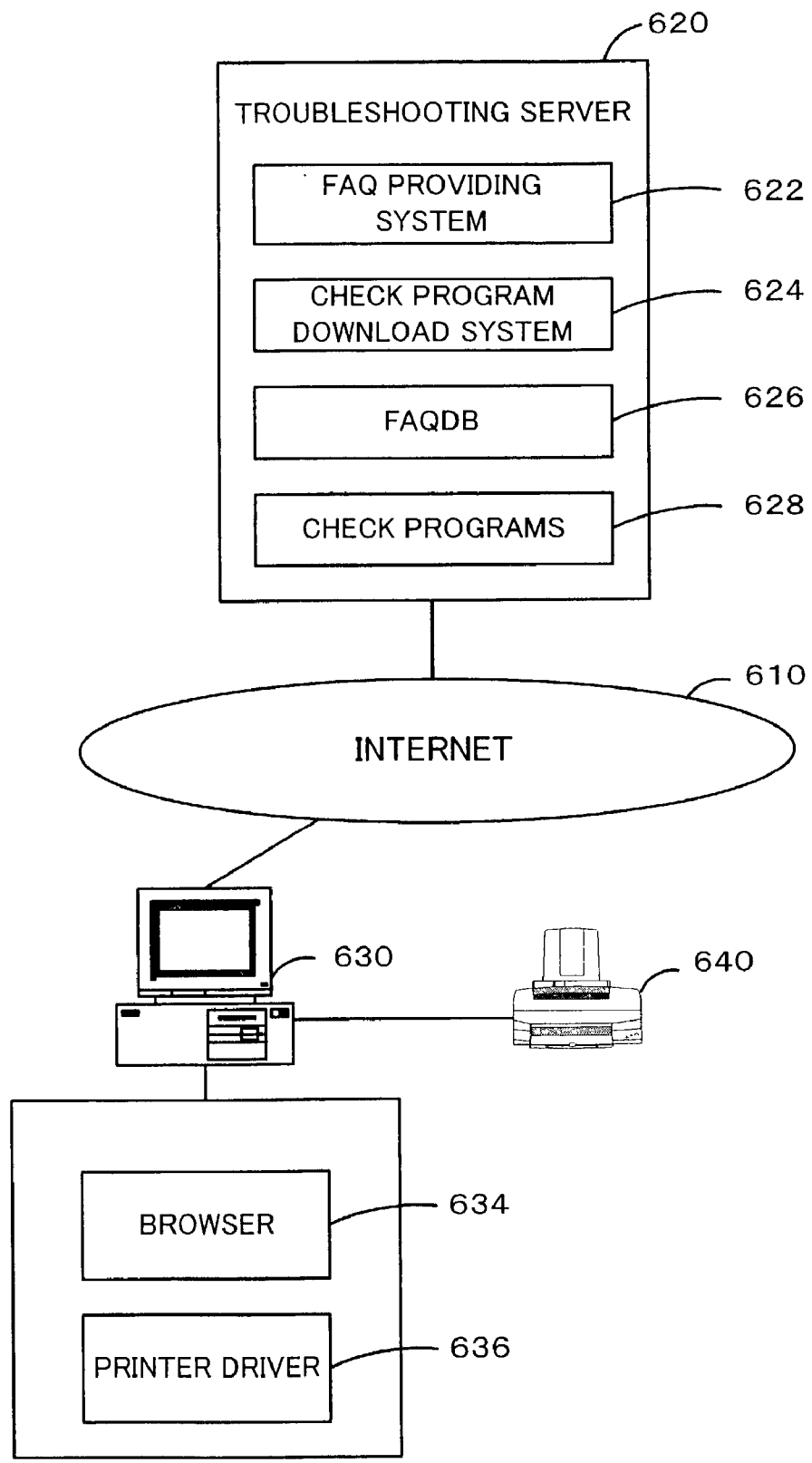
FIG. 20 schematically illustrates the construction of a troubleshooting system including a troubleshooting server 620 in the second embodiment of the present invention.

FIG. 20 schematically illustrates the construction of a troubleshooting system including a troubleshooting server 620 in the second embodiment. As illustrated, the troubleshooting server 620 of the second embodiment functions as a Web server that troubleshoots a printer 640 as a peripheral device linked with a client computer 630 via the Internet 610. The troubleshooting server 620 includes an FAQ providing system 622 that provides a client computer 630 in an interactive manner with FAQ windows including questions on problems or troubles and answers to the questions, and a download system 624 that is used to download a check program into the client computer 630, which causes the peripheral device to execute a predetermined check operation in connection with the FAQ. The troubleshooting server 620 also includes an FAQ database 626 that stores the FAQ windows provided by the FAQ providing system 622 with some linkage, and multiple check programs 628 that are programmed to be automatically activated on completion of their download and to make the peripheral device execute corresponding check operations.

Figure 21:
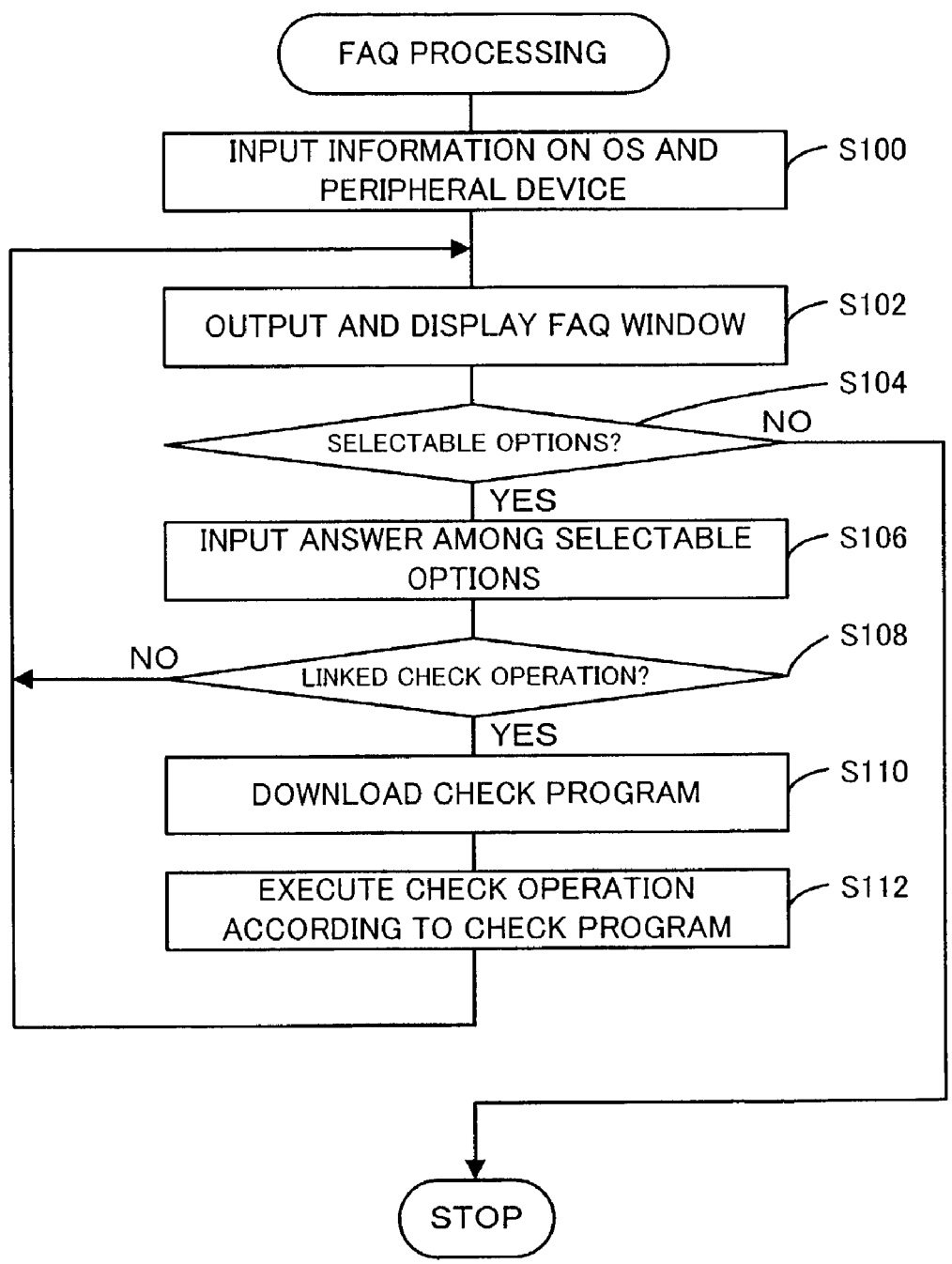
FIG. 21 is a flowchart showing an FAQ processing routine executed by the troubleshooting server 620 in the second embodiment.

The troubleshooting server 620 of the embodiment activates the FAQ providing system 622 in response to a requirement transmitted from the client computer 630 by a browser 634, and carries out a series of FAQ processing shown in FIG. 21 with regard to troubles and problems arising in the printer 640 as the peripheral device linked with the client computer 630. When the program enters the FAQ processing routine, the troubleshooting server 620 first inputs information on the environment of the client computer 630, for example, an operating system (OS) used in the client computer 630, the type of a peripheral device, and the version of a corresponding built-in driver (step S100). In one possible application, an environmental information input window is output to and displayed on the client computer 630 and requests the user of the client computer 630 to input required pieces of the environmental information. In the arrangement of this embodiment, however, the download system 624 works to download an environmental information check program as one of the check programs 628 into the client computer 630. The environmental information check program is activated on the client computer 630 to examine and output the environmental information of the client computer 630. The troubleshooting server 620 receives this output. The details of the download of the check program 628 and the examination as one of the check operations are similar to those of a check operation described later.

Figure 22:
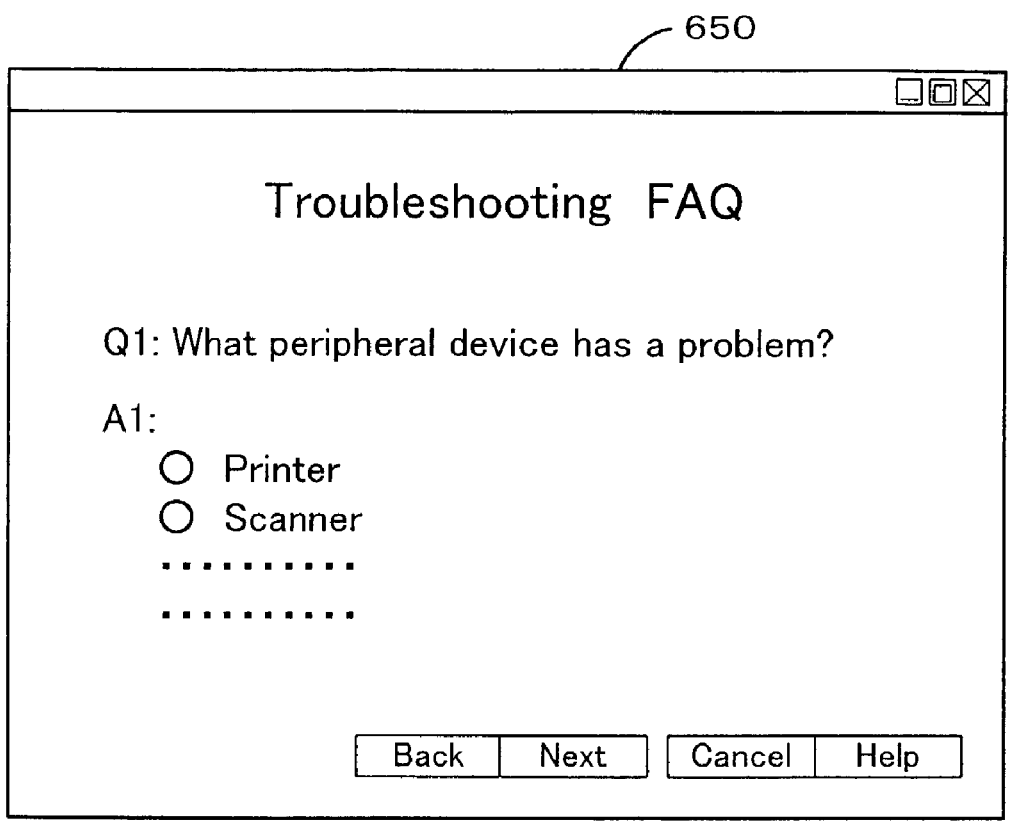
FIG. 22 shows an FAQ window 650.
Figure 23:
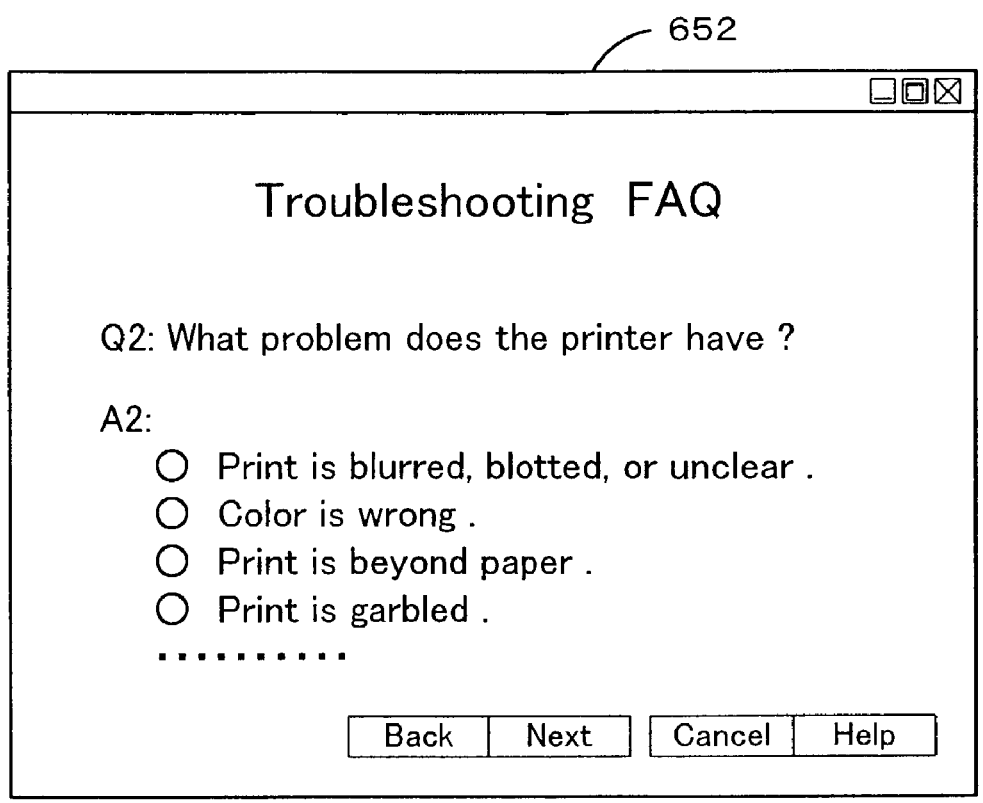
FIG. 23 show an FAQ windows 652.

After input of the environmental information of the client computer 630, an FAQ window is output to and displayed on the client computer 630 (step S102). FIGS. 22 and 23 show FAQ windows 650 and 652 in one example. The FAQ window 650 shown in FIG. 22 has a question 'Q1: What peripheral device has a problem?' and a list of peripheral devices, for example, 'Printer' and 'Scanner', as selectable options for answer. The FAQ window 652 shown in FIG. 23 has a question 'Q2: What problem does the printer have?' and a list of possible troubles, for example, 'Print is blurred, blotted, or unclear', 'Color is wrong', 'Print is beyond paper', and 'Print is garbled', as selectable options for answer.

It is then determined whether or not the display on the FAQ window includes selectable options (step S104). When the display includes selectable options, the troubleshooting server 620 receives input of an answer selected among the selectable options (step S106). The displays on both the FAQ window 650 shown in FIG. 22 and the FAQ window 652 shown in FIG. 23 include selectable options. In either case, input of the selected answer is executed. When one of the selectable options displayed on the FAQ window is selected and a 'Next' button is clicked, the troubleshooting server 620 retrieves the FAQ database 626 and determines whether or not any check operation according to a check program is linked with the selected answer (step S108). When no check operation according to a check program is linked with the selected answer, the program returns to step S102, where an FAQ window linked with the selected answer is output and displayed. When 'Printer' is selected among the selectable options on the FAQ window 650 shown in FIG. 22, the FAQ window 652 shown in FIG. 23 is linked with the selected answer 'Printer', but no check operation according to a check program is linked. This time, the process of step S102 accordingly outputs and displays the FAQ window 652 shown in FIG. 23.

Figure 24:
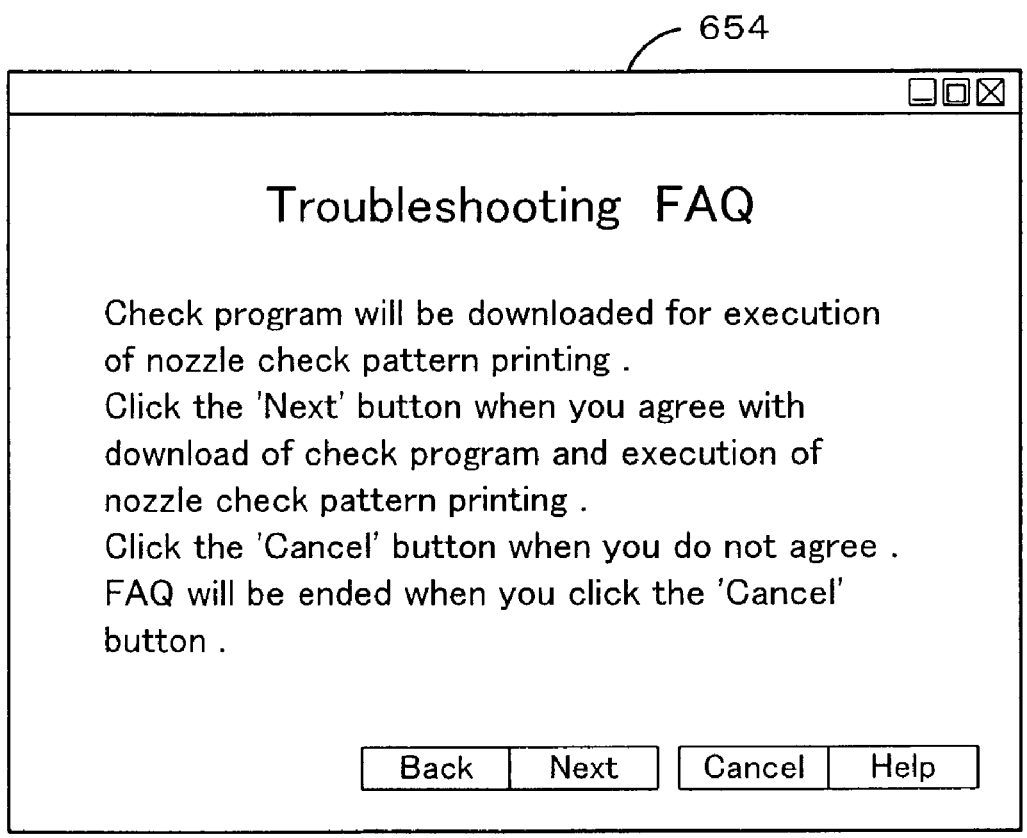
FIG. 24 shows a download agreement input window 654.
Figure 25:
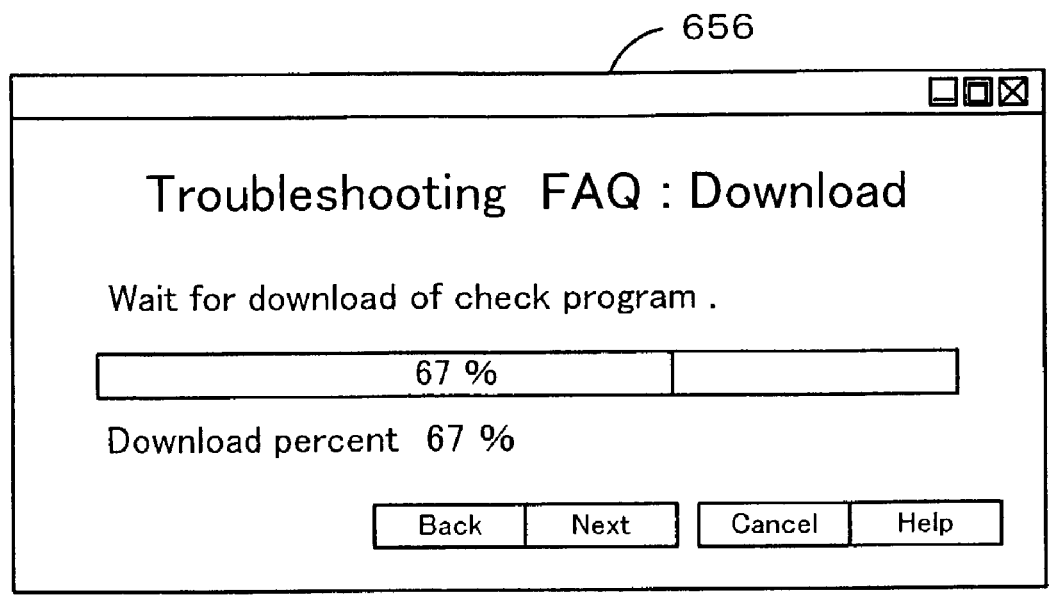
FIG. 25 shows a download window 656.
Figure 26:
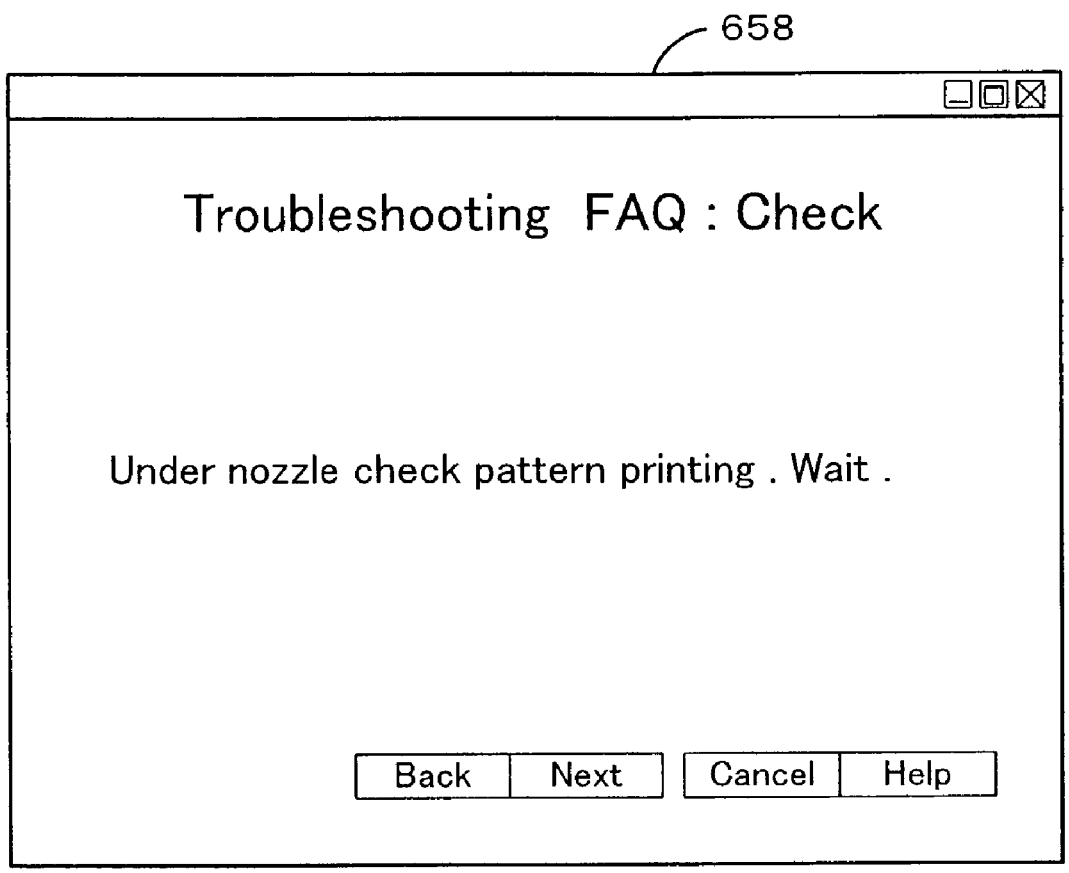
FIG. 26 shows a check display window 658.
Figure 27:
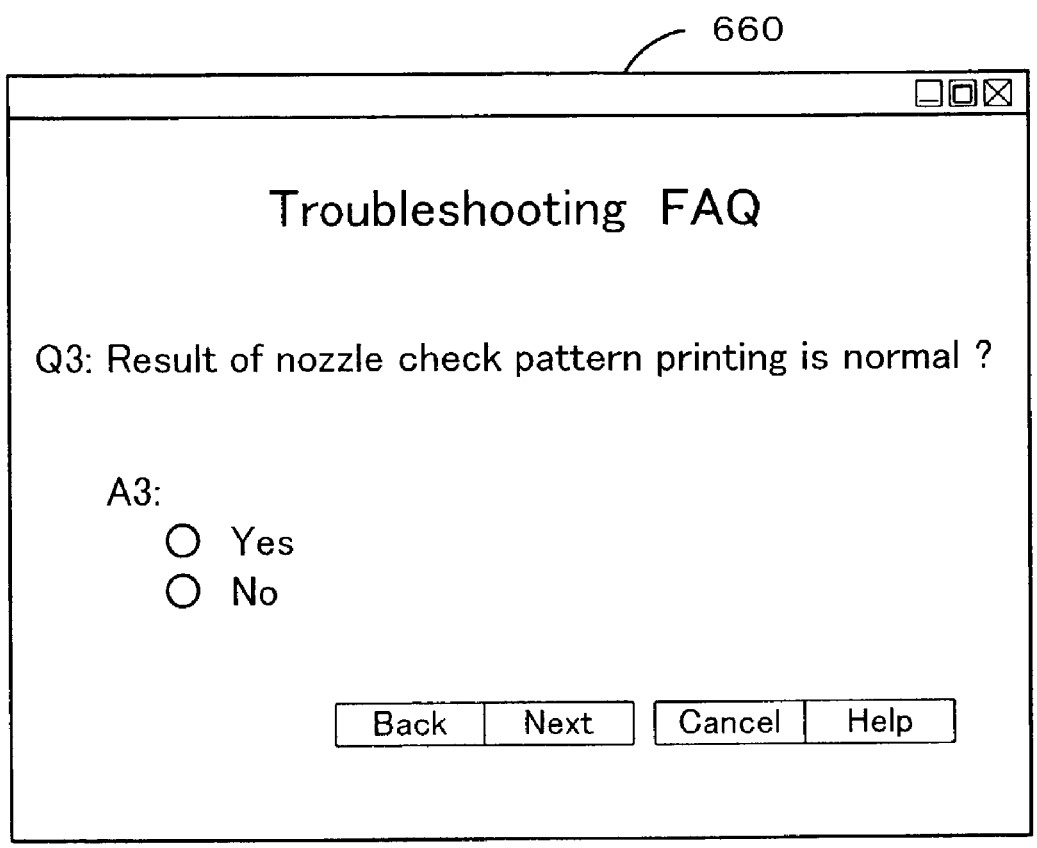
FIG. 27 shows an FAQ window 660 that is open after execution of nozzle check pattern printing.

When any check operation according to a check program is linked with the selected answer, on the other hand, the check program linked with the selected answer out of the multiple check programs 628 is downloaded into the client computer 630 (step S110). The downloaded check program is activated on the client computer 630 to execute the check operation (step S112). The program then returns to step S102, where an FAQ window linked with the selected answer is output and displayed to show a question and answers based on the result of the check operation. For example, when the option 'Print is blurred, blotted, or unclear' is selected for the answer on the FAQ window 652 shown in FIG. 23, a pattern printing check program, which executes nozzle check pattern printing as the check operation, is downloaded into the client computer 630. In this embodiment, the pattern printing check program is programmed to be automatically activated on completion of its download and to make the printer 640 start printing a predetermined pattern. The pattern printing check program accordingly causes the printer 640 to print a predetermined pattern as the check operation. FIG. 24 shows a download agreement input window 654, which is output to and displayed on the client computer 630 for agreement with the download of the pattern printing check program and the check operation according to the program. FIG. 25 shows a download window 656, which is output to and displayed on the client computer 630 in the course of the download of the check program. FIG. 26 shows a check display window 658, which is output to and displayed on the client computer 630 in the course of the nozzle check pattern printing as the check operation. FIG. 27 shows an FAQ window 660, which includes a question regarding the result of the check operation and selectable options for answer to the question. The display on the FAQ window 660 shown in FIG. 27 has a question 'Result of nozzle check pattern printing is normal?' and selectable options 'Yes' and 'No' for answer. The download of the check program is actualized by the Active X control (trade mark by Microsoft Corporation).

Figure 28:
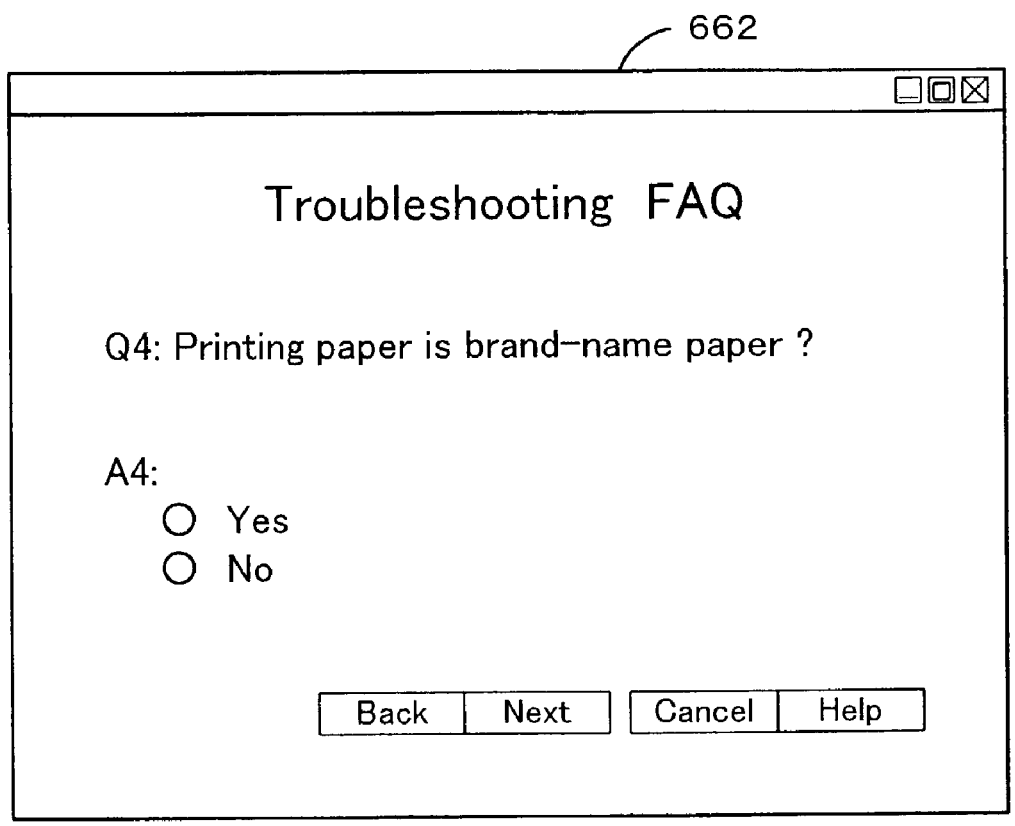
FIG. 28 shows an FAQ window 662 that is open in response to selection of 'Yes' on the FAQ window 660.
Figure 29:
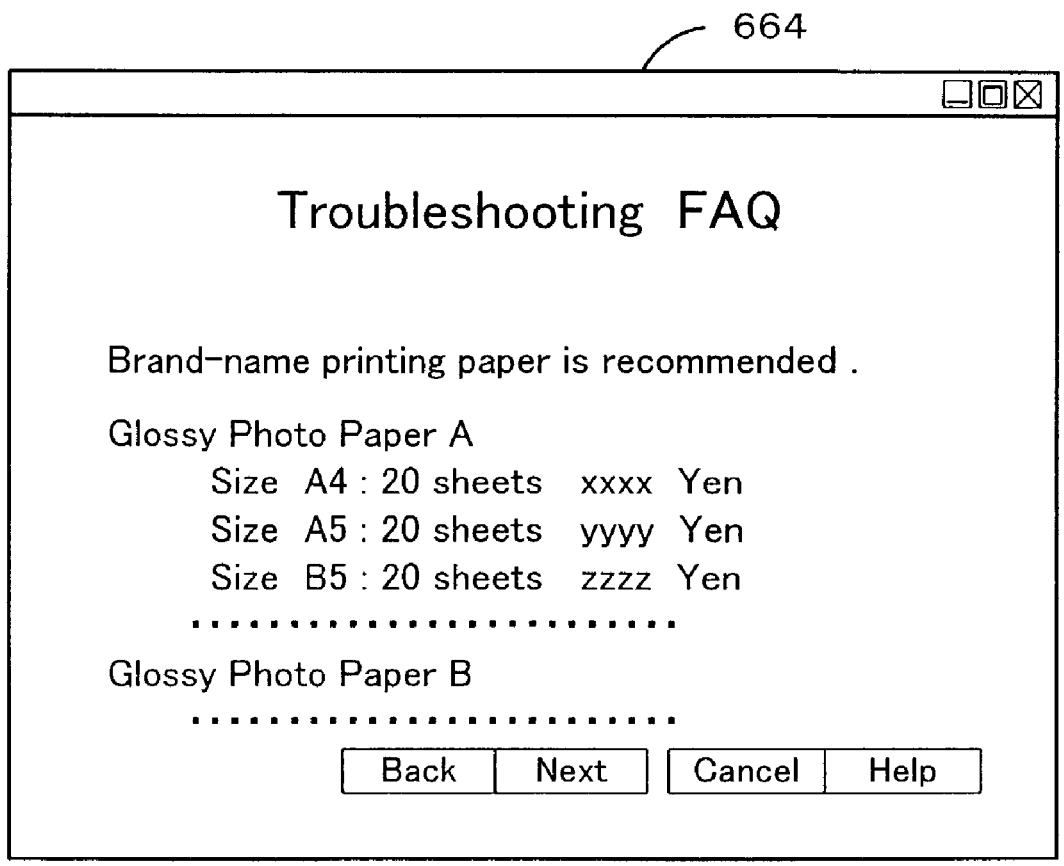
FIG. 29 shows an FAQ window 664 that is open in response to selection of 'No' on the FAQ window 662.

When it is determined at step S104 that the display on the FAQ window does not include any selectable options, for example, when the cause of the problem is specified and the display shows a measure to the problem for eliminating the cause or when the FAQ processing can not specify the cause of the problem and the display shows an advice for maintenance of the peripheral device at a service center, the program exits from this FAQ processing routine after the output and display of the FAQ window. For example, when the answer 'YES' is selected on the FAQ window 660 shown in FIG. 27, an FAQ window 662 shown in FIG. 28 is open to ask whether or not printing paper is brand-name paper. When the answer 'No' is selected on the FAQ window 662, an FAQ window 664 of FIG. 29, which does not include any selectable options, is open to recommend use of brand-name printing paper. The program then exits from the FAQ processing routine.

Figure 30:
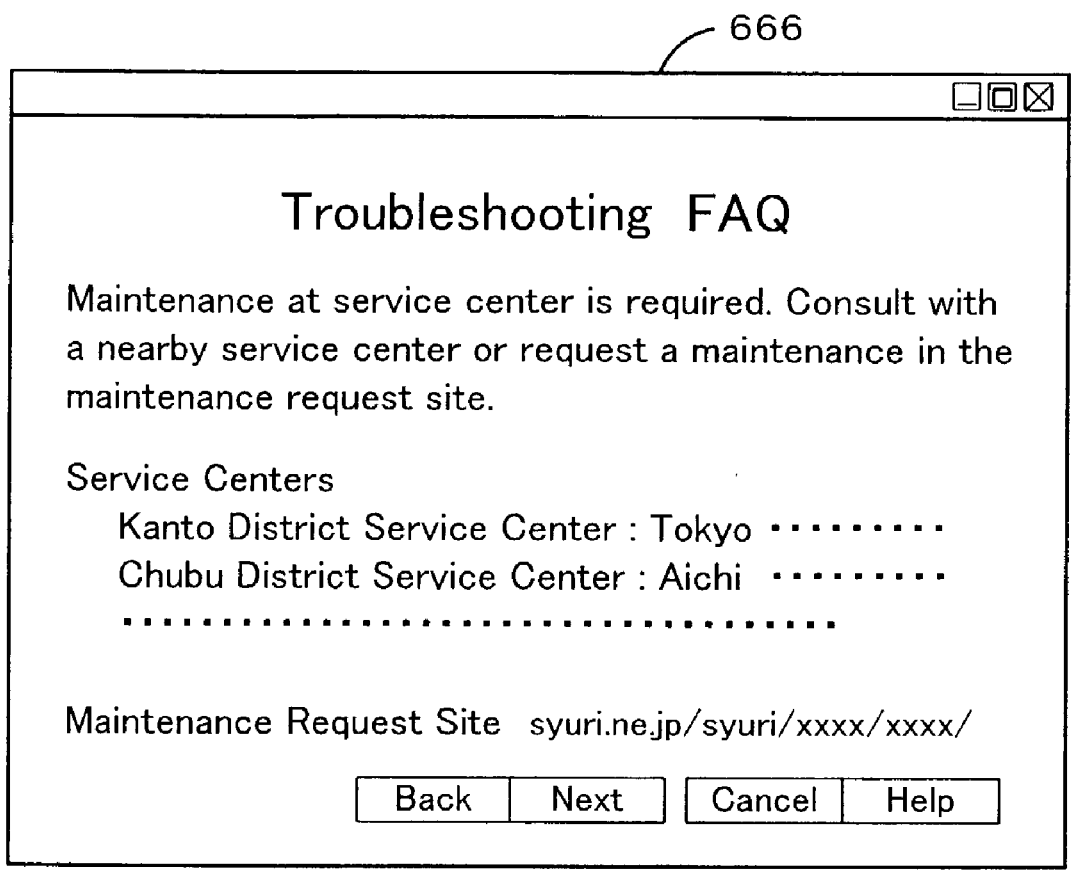
FIG. 30 shows an FAQ window 666 displayed to show that FAQ processing does not sufficiently deal with a trouble.

In the arrangement of the second embodiment, in the case of selection of the answer 'No' on the FAQ window 660 shown in FIG. 27, a cleaning check program, which executes cleaning of a print head as the check operation, is downloaded into the client computer 630 (step S110) and causes the printer 640 to execute cleaning of the print head as the check operation (step S112). The printer 640 is then required to carry out the nozzle check pattern printing again, and the FAQ window 660 shown in FIG. 27 is output and displayed (step S102). If the answer 'No' is selected again on the FAQ window 660 shown in FIG. 27, an FAQ window 666 of FIG. 30 is output and displayed, which shows that the FAQ processing can not specify the cause of the problem and maintenance of the peripheral device at a service center is recommended (step S102). The program then exits from this FAQ processing routine.

In the troubleshooting server 620 of the second embodiment discussed above, the combination of the FAQ with regard to a problem arising in the peripheral device and check operations according to check programs enables the user to select the more precise answer to the question in the FAQ. This arrangement ensures the more appropriate specification of the cause of the problem in the peripheral device and the more effective measure to the problem, thus enabling a larger portion of problems arising in the peripheral device to be solved on the users' side.

In the above description of the second embodiment, the troubleshooting server 620 provides the FAQ with regard to problems arising in the printer 640 linked with the client computer 630. The peripheral device is, however, not restricted to the printer, but may be any device, such as a scanner, an external storage device, a digital camera, or a display. In the case of FAQ with regard to problems arising in a scanner as the peripheral device, a check program may be programmed to make the scanner carry out scanning of a predetermined pattern as the check operation. The technique of this embodiment is also applicable to FAQ with regard to problems arising in a home appliance (for example, a microwave oven or a video cassette recorder) that internally has computer functions and is connectable with the Internet.

The FAQ processing executed by the troubleshooting server 620 of the second embodiment first inputs the environmental information of the client computer 630, for example, the operating system (OS) used in the client computer 630, the type of the peripheral device, and the version of the corresponding built-in driver. In one possible modification, an FAQ window may be used to receive input of the environmental information of the client computer 630. In this modified structure, a check program for examining the environmental information of the client computer 630 as the check operation and transmitting the result of the examination to the troubleshooting server 620 may be downloaded into the client computer 630. Otherwise the information may be directly collected on a Web page by the Active X control.

In the above description of the second embodiment, the troubleshooting server 620 provides the FAQ with regard to problems arising in the peripheral device of the client computer 630 connected to the troubleshooting server 620 via the Internet 610. The technique of the embodiment is also applicable to FAQ with regard to problems arising in the peripheral device of the client computer 630 connected to the troubleshooting server 620 via another network, such as an Intranet.

In the first embodiment discussed above, the printer driver auto installation is carried out as one of the troubleshooting procedures. The printer driver auto installation is, however, not limited to the troubleshooting procedure but may be executed alone. In the latter case, auto installation of a printer driver irrespective of the linguistic environment enables one identical server to deal with various languages. This application is discussed below as a third embodiment. The description of the third embodiment mainly regards auto installation of a printer driver, and the construction and the arrangement in relation to the FAQ or the printer auto diagnosis are not specifically described here.

Figure 31:
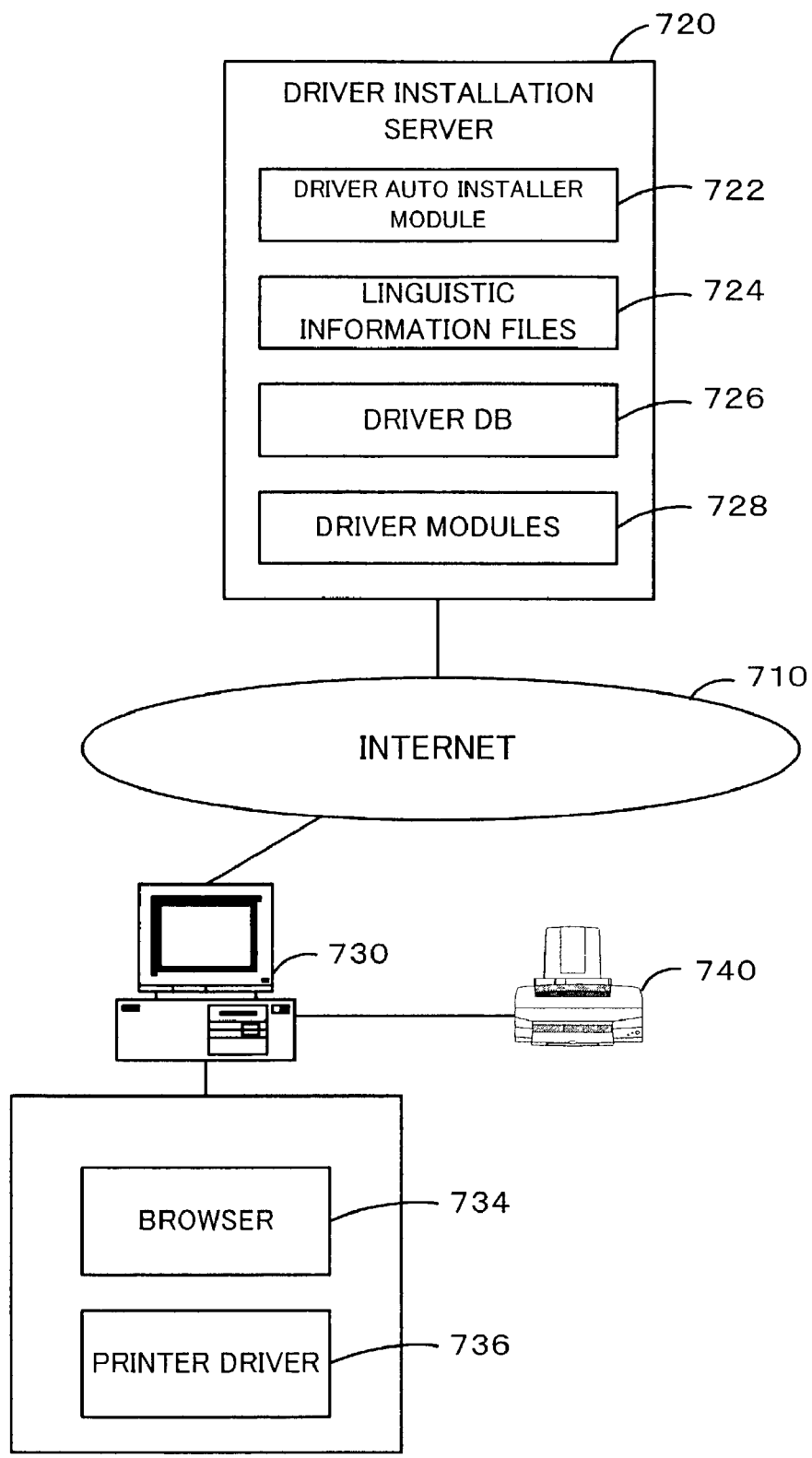
FIG. 31 schematically illustrates the construction of a driver auto installation system including a driver installation server 720 in a third embodiment of the present invention.

FIG. 31 schematically illustrates the construction of a driver auto installation system including a driver installation server 720 in the third embodiment. As illustrated, the driver installation server 720 functions as a Web server that automatically installs a printer driver applicable for a printer 740 connected with a client computer 730 via the Internet 710. The driver installation server 720 includes a driver auto installer module 722 that is automatically activated on completion of its download to the client computer 730 and downloads and installs a printer driver applicable for the printer 740. The driver installation server 720 also includes multiple linguistic information files 724 that store statements in the form of files, which are used in the process of auto installation and created in multiple languages, a driver database 726 that is constructed to store data regarding the versions of printer drivers and storage locations of corresponding driver modules mapped to respective printer types, and multiple driver modules 728 that function as programs of the respective printer drivers.

Figure 32:
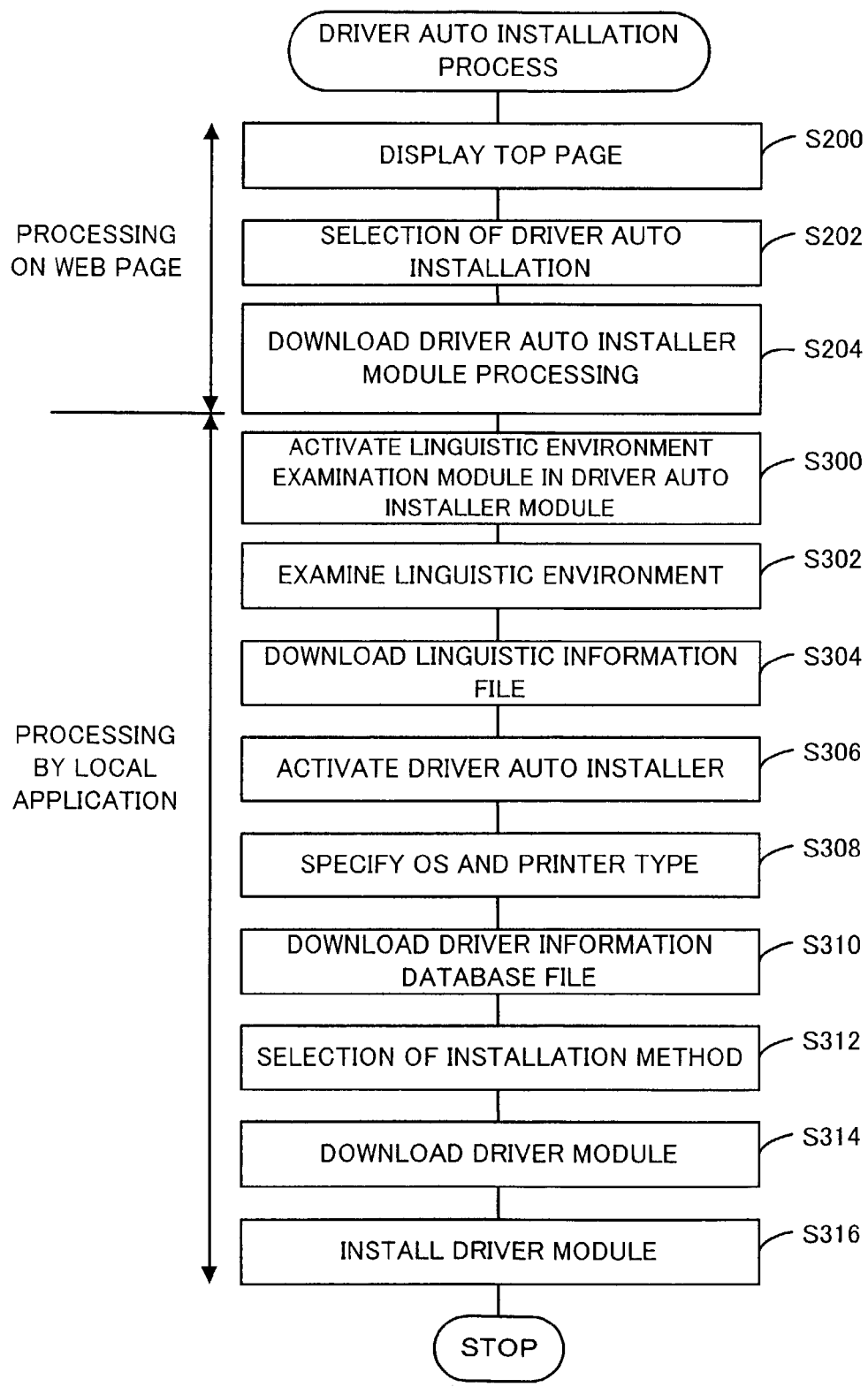
FIG. 32 is a flowchart showing a driver auto installation process.

The driver installation server 720 of the third embodiment downloads the driver auto installer module 722 to the client computer 730, in response to a requirement transmitted from the client computer 730 by a browser 734. The driver auto installer automatically activated on completion of its download to the client computer 730 downloads and installs a driver module applicable for the printer 740 in the linguistic environment of the client computer 730. Installation of the driver may overwrite an existing printer driver 736 currently installed or may be carried out independently of the existing printer driver 736. An exemplified driver auto installation process is described in detail with reference to FIG. 32.

Figure 33:
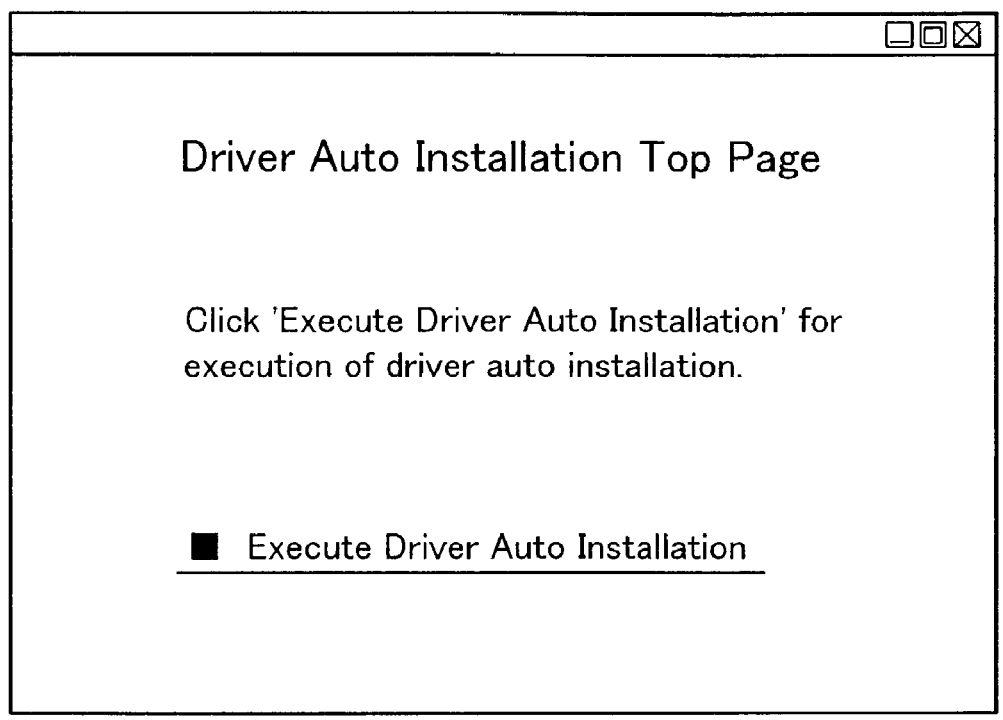
FIG. 33 shows a top page of driver auto installation.

In the driver auto installation process, in response to input of a URL assigned to a top page of driver auto installation from the browser 30 of the client computer 730, the driver installation server 720 outputs and displays the top page of driver auto installation as shown in FIG. 33 to and on the client computer 730 (step S200). When the user clicks an element 'Execute Driver Auto Installation' with a mouse on the top page of driver auto installation (step S202), the driver auto installer module 722 is downloaded from the driver installation server 720 to the client computer 730. The series of processing up to the download of the driver auto installer module 722 is executed on a Web page. A subsequent series of processing is executed by an application program activated on the client computer 730.

On completion of the download of the driver auto installer module 722 into the client computer 730, a linguistic environment examination module included in the downloaded driver auto installer module 722 is activated (step S300) to examine the linguistic environment of the OS used in the client computer 730 (step S302) and download a linguistic information file corresponding to a language specified as the result of the examination from the driver installation server 720 (step S304). The linguistic information files 724 corresponding to the respective languages are stored in the driver installation server 720. A linguistic information file appropriate for the examined linguistic environment out of the multiple linguistic information files 724 is downloaded to the client computer 730. Each of the multiple linguistic information files has a document of an announcement, which is created in a corresponding language, is stored in a preset format, and is displayed on the window of the client computer 730 in the process of auto installation of the driver. Auto activation of the linguistic environment examination module is actualized by the Active X control (trade mark by Microsoft Corporation). One example of the linguistic information file corresponding to Japanese is shown in FIG. 34.

Figure 35:
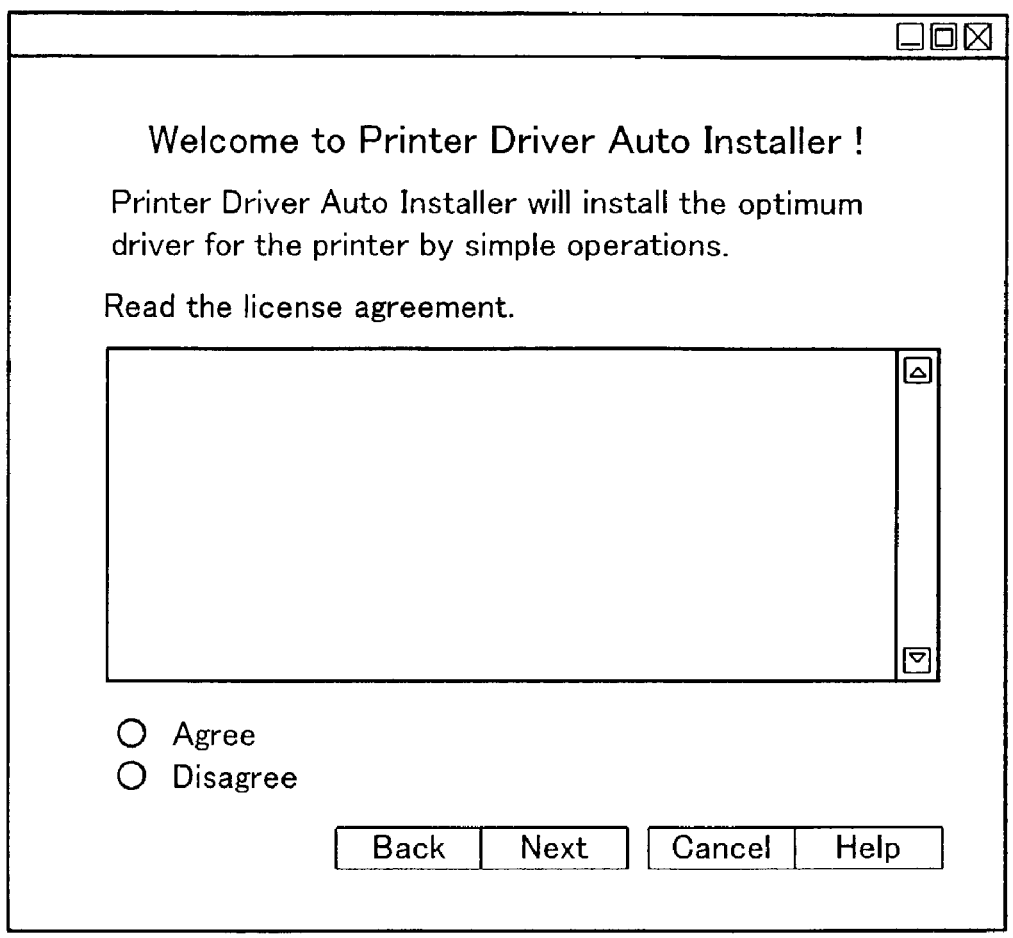
FIG. 35 shows a licensing agreement window.

After the download of the appropriate linguistic information file, a licensing agreement window is output, based on the downloaded linguistic information file. When the user of the client computer 730 selects 'Agree' on the licensing agreement window, the downloaded driver auto installer is activated (step S306). One example of the licensing agreement window is shown in FIG. 35. As clearly understood from the comparison between the licensing agreement window shown in FIG. 35 and the linguistic information file shown in FIG. 34, the statement on the announcement window in the process of auto installation of the printer driver has been written in the downloaded linguistic information file.

Figure 36:
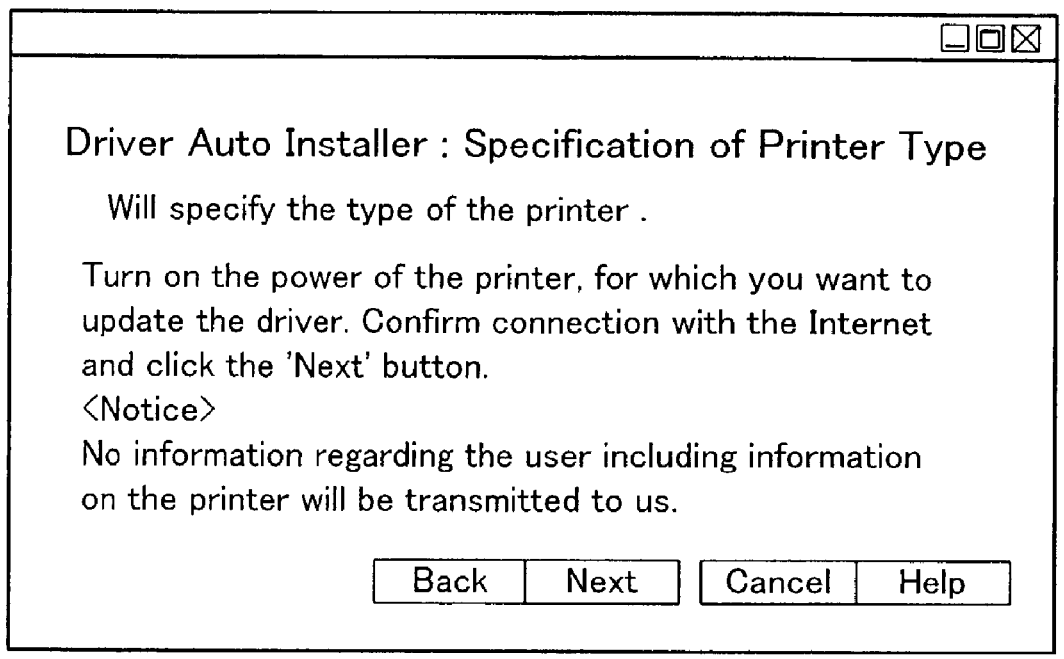
FIG. 36 shows a printer type specification window.
Figure 37:
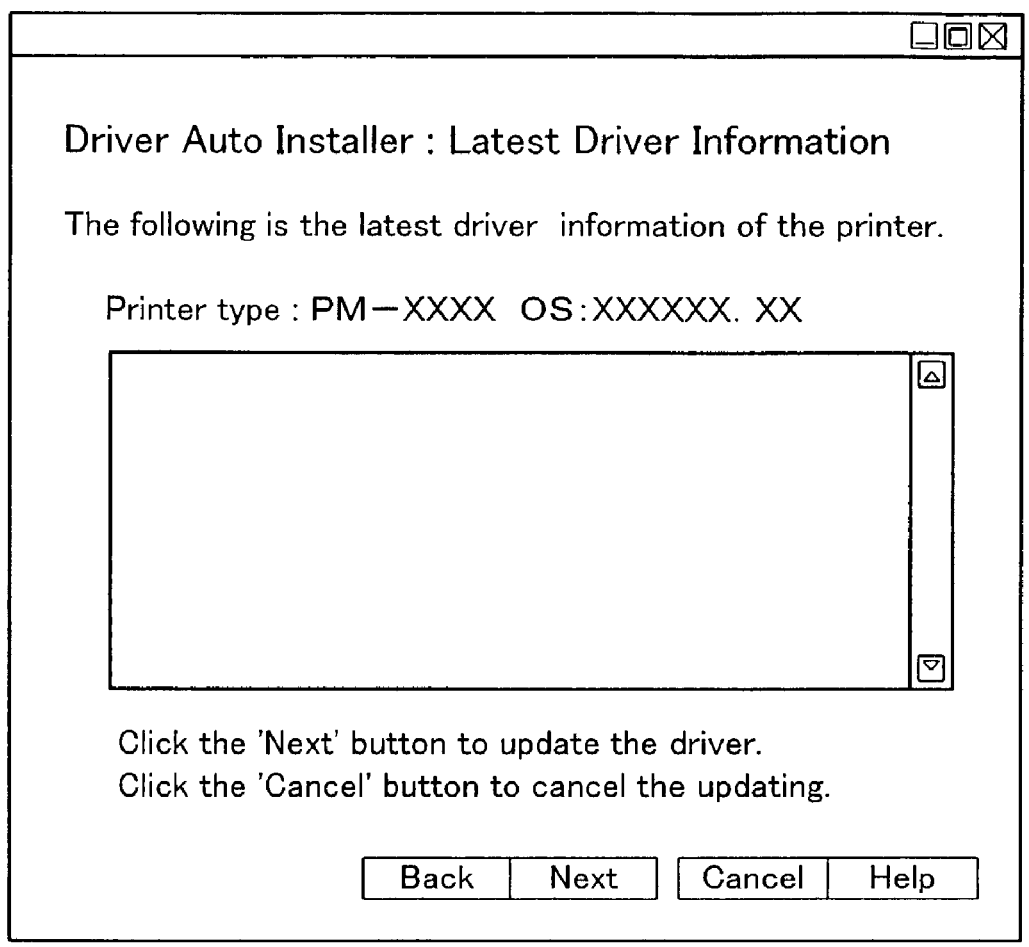
FIG. 37 shows a latest driver information window that is displayed on a client computer 730 based on information obtained by downloading a driver information database file.

The driver auto installer thus activated first displays a printer type specification window for specifying the OS and the type of the printer 740. In response to a click of a button 'Next' on this printer type specification window, the driver auto installer fetches information on the OS and the type of the printer 740 linked with the client computer 730 (step S308). According to the fetched information, a driver information database file corresponding to the printer type stored in the driver database 726 of the driver installation server 720 is downloaded (step S310). The information fetched here includes the type of the printer 740 and the printer driver 736 installed in the client computer 730 as printer information, and the type and the version of the OS used in the client computer 730 as OS information. The driver database 726 in the driver installation server 720 of this embodiment is constructed as a set of driver information database files, each of which corresponds to one printer type and includes the applicable OS, the version, and the storage location. One example of the printer type specification window is shown in FIG. 36. FIG. 37 shows one example of a latest driver information window, which is displayed on the client computer 730 based on the information obtained by downloading the driver information database file. The statements of FIGS. 36 and 37 are also based on the downloaded linguistic information file.

Figure 38:
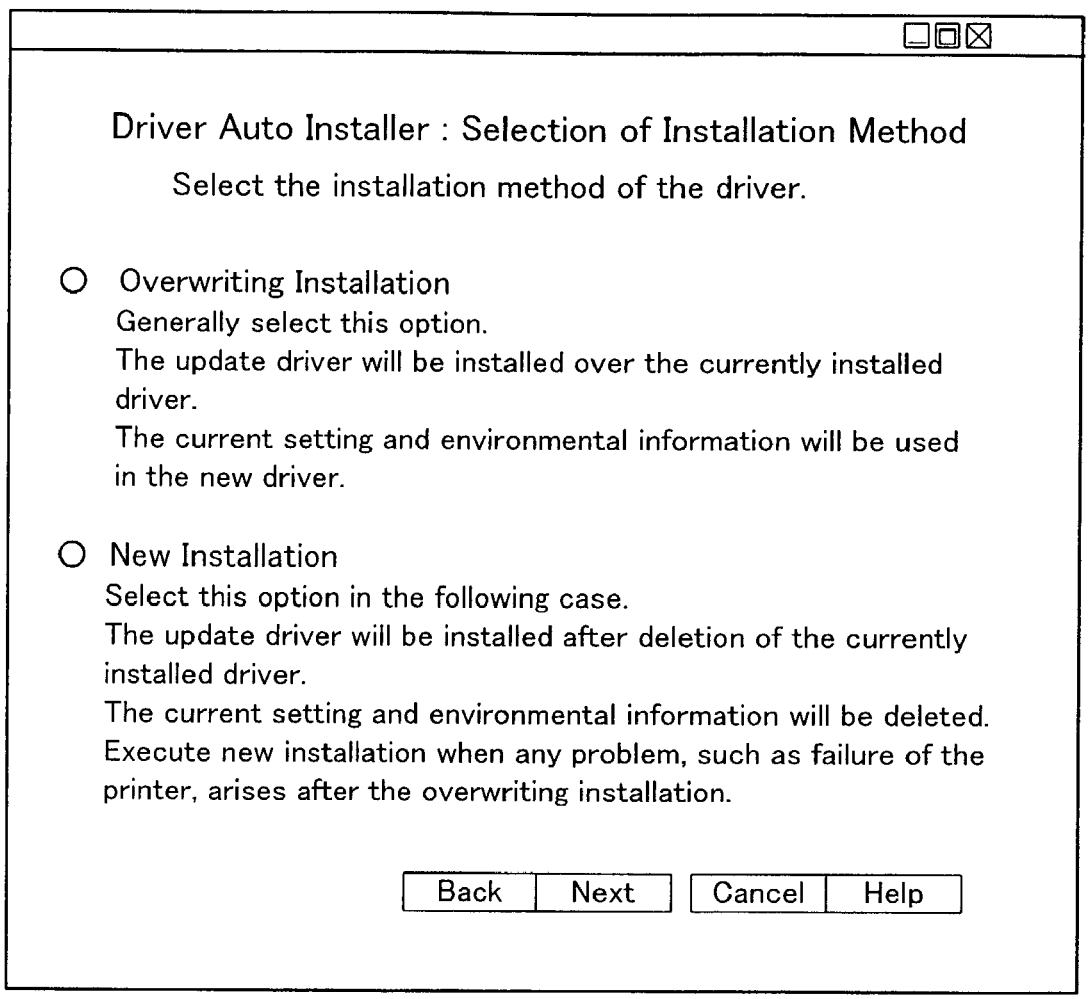
FIG. 38 shows an installation method selection window.
Figure 39:
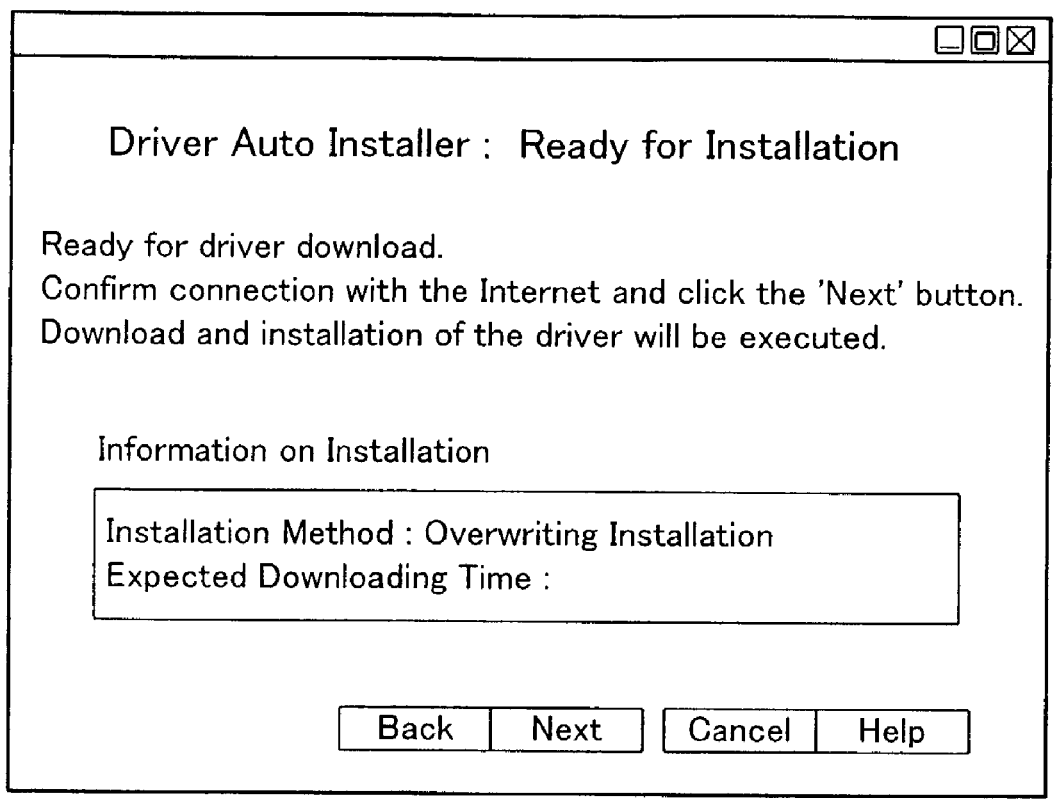
FIG. 39 shows an installation ready window.
Figure 40:
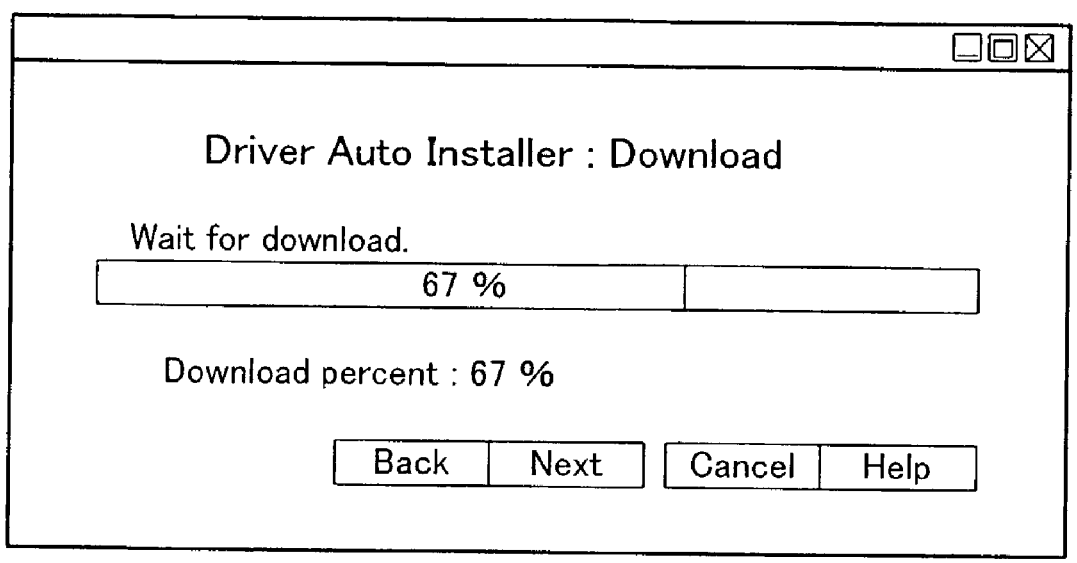
FIG. 40 shows a window that is displayed on the computer 30 in the process of downloading a driver module.

An installation method selection window as shown in FIG. 38 is then open to ask the user to select either overwriting installation or new installation of the driver (step S312). In response to selection of the installation method, an installation ready window as shown in FIG. 39 is open for final confirmation of the installation. On the final confirmation, a printer driver module applicable of the printer 740 is downloaded from the storage location of the printer driver module written in the downloaded driver information database file (step S314). FIG. 40 shows a window that is displayed on the client computer 730 in the process of downloading the driver module.

Figure 41:
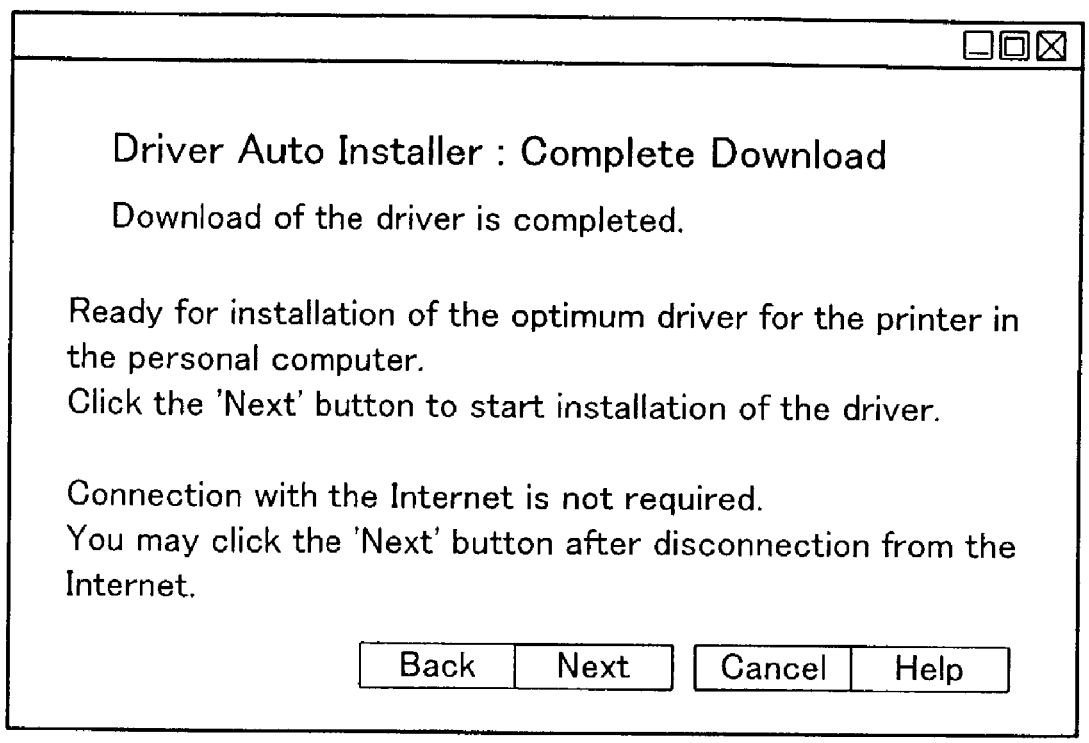
FIG. 41 shows a download complete window.

On conclusion of the download, a download complete window as shown in FIG. 41 is displayed. In response to the user's instruction of installing the driver applicable for the printer 740, the downloaded driver module is installed (step S316). The program then exits from this installation routine.

As discussed above, the driver auto installer module 722 of the third embodiment is automatically activated on completion of its download to the client computer 730 to automatically download and install the printer driver applicable for the printer 740 linked with the client computer 730. The driver auto installer module 722 of the third embodiment activates its linguistic environment examination module to examine the linguistic environment of the client computer 730 and download the linguistic information file corresponding to the examined linguistic environment. The statement of announcement is displayed on the client computer 730, based on the downloaded linguistic information file. It is accordingly not necessary to provide the driver auto installer module 722 corresponding to each language. In the driver auto installer module 722 of the third embodiment, the activated driver auto installer automatically fetches information on the type of the printer 740 and the OS used in the client computer 730 and downloads the driver information database file from the driver installation server 720 based on the fetched information. The driver auto installer then specifies the storage location of the optimum driver for the printer 740 in the driver installation server 720 and downloads the optimum driver for the printer 740. This arrangement enables even the user who does not have sufficient knowledge of the computer or the printer to readily install the optimum driver for the printer 740.

In the driver auto installation process of the third embodiment, the series of processing up to the download of the driver auto installer module 722 to the client computer 730 is executed on the Web page provided by the driver installation server 720. The subsequent series of processing is executed by the driver auto installer downloaded to and activated on the client computer 730. This arrangement desirably distributes the load of the driver auto installation process, thereby reducing the load applied to the driver installation server 720.

The driver installation server 720 of the third embodiment includes the driver auto installer module 722, which is automatically activated on the client computer 730 on its completion of download to the client computer 730 to automatically download and install the driver applicable for the printer 740 linked with the client computer 730. In response to the user's request, the driver auto installer module 722 is downloaded to the user's client computer 730 to automatically install the optimum driver for the printer 740 linked with the user's client computer 730. This arrangement enables even the user who does not have sufficient knowledge of the computer or the printer to readily install the optimum driver for the printer 740.

In the driver installation server 720 of the third embodiment, the driver auto installer module 722 examines the linguistic environment of the client computer 730 and downloads the linguistic information file corresponding to the result of the examination to display the statement of announcement for installation. In one possible modification, multiple driver auto installation top pages corresponding to respective languages are provided. The driver auto installer module 722 corresponding to the language of the selected driver auto installation top page is downloaded to and automatically activated on the client computer 730.

In the driver installation server 720 of the third embodiment, the driver auto installer module 722 automatically installs the driver applicable for the printer 740 linked with the client computer 730 as the peripheral device. This technique is, however, not restricted to the printer, but is also applicable to automatically install an optimum driver for any peripheral device linked with the client computer 730, for example, a scanner. The technique is also applicable to automatically install part or whole of a program incorporated in a home appliance (for example, a microwave oven or a video cassette recorder), which internally has computer functions and is connectable with the Internet.

The above embodiment is to be considered in all aspects as illustrative and not restrictive. There may be many modifications, change, and alterations without departing from the scope or sprit of the main characteristics of the present invention. All changes within the meaning and range of equivalency of the claims are therefore intended to be embraced therein.

What is claimed is:

1. A driver auto installation device constructed as an independent device to automatically install a driver program, which is applicable to a peripheral device linked with a client computer, into the client computer via a network, the driver auto installation device comprising:

an auto installation selection window output module that outputs an auto installation selection window to the client computer via the network to allow the client computer to selectively input an auto installation instruction for installation of the driver program;

a driver storage module that stores multiple driver programs respectively applicable to multiple peripheral devices;

a driver output module that outputs one of the multiple driver programs stored in the driver storage module to the client computer to be downloaded to and installed in the client computer;

a storage location output module that outputs a specified storage location of a specific driver program, which is applicable to a certain peripheral device, in the driver storage module to the client computer, in response to a storage location output request sent from the client computer together with information regarding the certain peripheral device;

a linguistic file storage module that stores multiple linguistic files written in multiple different languages, where each of the multiple linguistic files records a character string in one of the multiple different languages to be displayed on a driver download window of the client computer in the course of downloading the driver program;

an installer storage module that stores a driver installer program that is downloaded to the client computer to be automatically activated in the client computer and is used to install the specific driver program into the client computer, the driver installer program activated in the client computer acquiring the information regarding the certain peripheral device linked with the client computer, sending the storage location output request together with the acquired information to the storage location output module for output of the specified storage location of the specific driver program applicable to the certain peripheral device, and sending a driver output request together with the specified storage location of the specific driver program to the driver output module for output and download of the specific driver program stored in the specified storage location by the driver output module to the client computer, the driver installer program activated in the client computer examining a linguistic environment of the client computer, downloading a linguistic file corresponding to the examined linguistic environment of the client computer from the linguistic file storage module to display the character string recorded in the downloaded linguistic file on the driver download window of the client computer, and installing the specific driver program, which is downloaded in response to the driver output request, in the client computer; and an installer output module that outputs and downloads the driver installer program stored in the installer storage module to the client computer, in response to an entry of the auto installation instruction on the auto installation selection window by the client computer.

2. The driver auto installation device in accordance with claim 1, wherein the information regarding the peripheral device includes a model of the peripheral device and a type of an operating system used in the peripheral device.

3. The driver auto installation device in accordance with claim 1, wherein the network is the Internet.

4. The driver auto installation device in accordance with claim 3, the driver auto installation device being actualized by a Web server.

* * * * *